(12) United States Patent
Takahama et al.

(10) Patent No.: US 10,648,888 B2
(45) Date of Patent: May 12, 2020

(54) PLANT STATE MONITORING METHOD, PLANT STATE MONITORING COMPUTER PROGRAM, AND PLANT STATE MONITORING APPARATUS

(75) Inventors: Masayuki Takahama, Hyogo (JP); Naotaka Mikami, Hyogo (JP); Masashi Inoue, Hyogo (JP); Yoshiyuki Hamaji, Hyogo (JP)

(73) Assignee: MITSUBISHI HITACHI POWER SYSTEMS, LTD., Yokohama-Shi, Kanagawa (JP)

( * ) Notice: Subject to any disclaimer, the term of this patent is extended or adjusted under 35 U.S.C. 154(b) by 796 days.

(21) Appl. No.: 12/679,619

(22) PCT Filed: Feb. 27, 2009

(86) PCT No.: PCT/JP2009/053747
§ 371 (c)(1),
(2), (4) Date: Mar. 23, 2010

(87) PCT Pub. No.: WO2009/107805
PCT Pub. Date: Sep. 3, 2009

(65) Prior Publication Data
US 2010/0198555 A1 Aug. 5, 2010

(30) Foreign Application Priority Data

Feb. 27, 2008 (JP) .................. 2008-046696
Dec. 3, 2008 (JP) .................. 2008-308802

(51) Int. Cl.
*G01M 15/14* (2006.01)
*F01D 19/00* (2006.01)
(Continued)

(52) U.S. Cl.
CPC .............. *G01M 15/14* (2013.01); *F01D 19/00* (2013.01); *F01D 21/003* (2013.01); *F02C 9/00* (2013.01); *G05B 23/024* (2013.01)

(58) Field of Classification Search
CPC ...... F01D 19/00; F01D 21/003; G01M 15/14; G05B 23/024; F02C 9/00
(Continued)

(56) References Cited

U.S. PATENT DOCUMENTS 5,586,066 A * 12/1996 White et al. .................. 702/181
5,742,522 A * 4/1998 Yazici et al. .................. 702/185
(Continued)

FOREIGN PATENT DOCUMENTS

JP 09-026819 A 1/1997
JP 10-124766 A 5/1998
(Continued)

OTHER PUBLICATIONS

ISR for PCT/JP2009/053747 dated May 19, 2009.
(Continued)

*Primary Examiner* — Alexander Satanovsky
(74) *Attorney, Agent, or Firm* — Kanesaka Berner and Partners LLP

(57) ABSTRACT

Provided is a plant state monitoring method which monitors an operation state of a plant by using the Mahalanobis distance based on the plant state amount. The method creates a first unit space as a set of data used to be a reference when judging whether the plant operation state during a start operation period is normal according to the state amount in the plant start operation period. The method also creates a second unit space as a set of data used to be a reference when judging whether the plant operation state during a load operation period is normal according to the state amount in the plant load operation period.

31 Claims, 6 Drawing Sheets

(51) Int. Cl.
   *F01D 21/00* (2006.01)
   *G05B 23/02* (2006.01)
   *F02C 9/00* (2006.01)
(58) Field of Classification Search
   USPC .................................. 702/179, 182, 183
   See application file for complete search history.

(56) References Cited

U.S. PATENT DOCUMENTS

| | | | |
|---|---|---|---|
| 6,862,484 | B2 | 3/2005 | Hayashi |
| 7,076,318 | B2 | 7/2006 | Hayashi |
| 7,539,599 | B2* | 5/2009 | Hasegawa et al. ............ 702/185 |
| 7,815,366 | B2* | 10/2010 | Okamura et al. ................ 374/45 |
| 2003/0149547 | A1* | 8/2003 | Nakao et al. ................. 702/183 |
| 2006/0182451 | A1* | 8/2006 | Shoji et al. ........................ 399/9 |
| 2006/0230313 | A1 | 10/2006 | Grichnik et al. |
| 2007/0156373 | A1 | 7/2007 | Yamashita et al. |

FOREIGN PATENT DOCUMENTS

| | | |
|---|---|---|
| JP | 10-124766 A | 8/1998 |
| JP | 2000114130 A | 4/2000 |
| JP | 2001-290508 A | 10/2001 |
| JP | 2002318617 A | 10/2002 |
| JP | 2004-232968 A | 8/2004 |
| JP | 2004343365 A1 | 12/2004 |
| JP | 2005-003474 | 1/2005 |
| JP | 2005-207644 | 8/2005 |
| JP | 2005227518 A1 | 8/2005 |
| JP | 2006277247 A | 10/2006 |
| JP | 2006-309570 A | 11/2006 |
| JP | 2007213194 A | 8/2007 |
| JP | 2007305612 A | 11/2007 |
| WO | 2007/129566 A1 | 11/2007 |

OTHER PUBLICATIONS

Written Opinion for PCT/JP2009/053747 dated May 19, 2009.
Office Action for JP 2010-500785 dated Oct. 25, 2011.
European Search Report for Application No. 09715416.5 dated Jan. 21, 2011.
Office Action for JP 2010-500785 dated Oct. 25, 2010.
Notice of Allowance for JP2010-500785 dated Jun. 5, 2012.
Office Action as dated Jan. 29, 2013 in corresponding Japanese Application No. 2011-269160.
Office Action dated Sep. 25, 2014, corresponding to U.S. Appl. No. 14/292,476.
Office Action dated Jan. 23, 2015, corresponding to U.S. Appl. No. 14/292,476.
Final Office Action in U.S. Appl. No. 14/292,476, dated Feb. 17, 2016.
Office Action in U.S. Appl. No. 14/292,476, dated Nov. 10, 2016.
Office Action dated Nov. 10, 2015, corresponding to U.S. Appl. No. 14/292,476.

* cited by examiner

PLANT STATE MONITORING METHOD, PLANT STATE MONITORING COMPUTER PROGRAM, AND PLANT STATE MONITORING APPARATUS

TECHNICAL FIELD

The present invention relates to a plant state monitoring method of determining whether or not a plant is normally operated, a computer program used to monitor the state of a plant, and a plant state monitoring apparatus.

The present application is national phase of PCT/JP2009/053747, filed on Feb. 27, 2009 and claims priority from Japanese Patent Application No. 2008-046696, filed Feb. 27, 2008, and Japanese Patent Application No. 2008-308802, filed Dec. 3, 2008, the contents of which are incorporated herein by reference in their entirety.

BACKGROUND ART

In various kinds of plants, such as gas turbine power generation plants, nuclear power generation plants, and chemical plants, the quantity of state of the plant, such as temperature or pressure, is acquired from the plant in order to monitor whether or not the plant is normally operated. In monitoring the plant, it is necessary to monitor a plurality of state quantities and the tendency of the state quantities, and a skilled technique capable of determining whether or not the plant is normally operated is needed. The following Patent Citation 1 discloses a technique in which a plurality of reference spaces (referred to as unit spaces) is prepared for each season in a year and is used to correspond to a season variation, thereby monitoring the operation state of a refrigeration cycle apparatus based on the Mahalanobis distance. When this technique is applied to monitor the plant, it is possible to relatively easily monitor a plurality of state quantities.
[Patent Citation 1]
Japanese Unexamined Patent Application, First Publication No. 2005-207644

DISCLOSURE OF INVENTION

Technical Problem

However, in the technique disclosed in the above Patent Citation 1, it is possible to determine whether there is an abnormality when a rated load is applied based on the relationship between the Mahalanobis distance and the unit space that is created from the quantity of state acquired when the rated load is applied. However, since the operation state during a startup is different from that when the rated load is applied, a normal state is likely to be erroneously determined to be an abnormal state.

The performance of the plant is likely to be reduced due to, for example, the deterioration of apparatuses over time. In some cases, a decrease in performance over time is assumed in advance and a certain degree of decreased performance is regarded as a normal state. In this state, the plant is continuously operated. In the technique disclosed in the above Patent Citation 1, different unit spaces are used in a year. During the period for which the same unit space is used, the deterioration of the performance over time is likely to be determined as abnormal.

The present invention has been made in order to solve the above-mentioned problems, and an object of the present invention is to provide a plant state monitoring method, a plant state monitoring computer program, and a plant state monitoring apparatus capable of accurately determining whether the state of a plant is normal or abnormal when a start operation is performed under operation conditions different from those when a rated load is applied, and when the performance of an apparatus decreases over time within an allowable range.

Technical Solution

A first aspect of a plant state monitoring method of monitoring an operation state of a plant using a Mahalanobis distance based on the quantity of state of the plant according to the present invention at least includes: creating a first unit space, which is a set of data serving as a standard for determining whether or not the operation state of the plant during a start operation period is normal, based on the quantity of state of the plant during the start operation period; and creating a second unit space, which is a set of data serving as a standard for determining whether or not the operation state of the plant during a load operation period is normal, based on the quantity of state of the plant during the load operation period.

In the first aspect of the plant state monitoring method according to the present invention, data of the second unit space may be collected from both when the load of the plant varies and when a rated load is applied.

In the first aspect of the plant state monitoring method according to the present invention, the first unit space may be created based on the quantity of state of the plant acquired during a period from the time that is a first time before the time when the state of the plant is evaluated during the start operation period of the plant to the time that is a second time before that time. In addition, the second unit space may be created based on the quantity of state of the plant acquired during a period from the time that is a third time before the time when the state of the plant is evaluated during the load operation period of the plant to the time that is a fourth time before that time.

In the first aspect of the plant state monitoring method according to the present invention, the first unit space and the second unit space may be created based on the quantity of state which is periodically collected at predetermined time intervals.

A first aspect of a plant state monitoring computer program according to the present invention is executed by a computer of a plant state monitoring apparatus which monitors an operation state of a plant using a Mahalanobis distance based on the quantity of state of the plant. The plant state monitoring computer program at least includes: creating a first unit space, which is a set of data serving as a standard for determining whether or not the state of the plant during a start operation period is normal, based on the quantity of state of the plant during the start operation period and creating a second unit space, which is a set of data serving as a standard for determining whether or not the state of the plant during a load operation period is normal, based on the quantity of state of the plant during the load operation period; calculating the Mahalanobis distance based on the quantity of state of the plant, acquired when the state of the plant is evaluated; and determining the state of the plant based on the Mahalanobis distance and a predetermined threshold value obtained from the first and second unit spaces.

In the first aspect of the plant state monitoring computer program according to the present invention, the first unit space may be created based on the quantity of state of the plant acquired during a period from the time that is a first time before the time when the state of the plant is evaluated during the start operation period of the plant to the time that is a second time before that time. In addition, the second unit space may be created based on the quantity of state of the plant acquired during a period from the time that is a third time before the time when the state of the plant is evaluated during the load operation period of the plant to the time that is a fourth time before that time.

A plant state monitoring apparatus for monitoring an operation state of a plant using a Mahalanobis distance based on the quantity of state of the plant according to the present invention at least includes: a unit space creating unit which creates a first unit space, which is a set of data serving as a standard for determining whether or not the state of the plant during a start operation period is normal, based on the quantity of state of the plant during the start operation period, and creates a second unit space, which is a set of data serving as a standard for determining whether or not the state of the plant during a load operation period is normal, based on the quantity of state of the plant during the load operation period; a Mahalanobis distance calculating unit which calculates the Mahalanobis distance based on the quantity of state of the plant, acquired when the state of the plant is evaluated; and a plate state determining unit which determines the state of the plant based on the Mahalanobis distance calculated by the Mahalanobis distance calculating unit and a predetermined threshold value obtained from the first and second unit spaces created by the unit space creating unit.

In the first aspect of the plant state monitoring apparatus according to the present invention, the unit space creating unit may create the first unit space based on the quantity of state of the plant acquired during a period from the time that is a first time before the time when the state of the plant is evaluated during the start operation period of the plant to the time that is a second time before that time. In addition, the unit space creating unit may create the second unit space based on the quantity of state of the plant acquired during a period from the time that is a third time before the time when the state of the plant is evaluated during the load operation period of the plant to the time that is a fourth time before that time.

A second aspect of the plant state monitoring method of monitoring an operation state of a plant according to the present invention at least includes: creating a third unit space, which is a set of data serving as a standard for determining whether or not the operation state of the plant is normal, based on the quantity of state of the plant during a period from the time that is a fifth time before the time when the state of the plant is evaluated to the time that is a sixth time before that time.

A third aspect of a plant state monitoring method of monitoring an operation state of a plant using a Mahalanobis distance related to the quantity of state of the plant according to the present invention at least includes: acquiring from the plant the quantity of state for creating a unit space of the plant, which is used to create a third unit space which is a set of data serving as a standard for determining whether or not the operation state of the plant is normal; acquiring the quantity of state of the plant when the state of the plant is evaluated; calculating the Mahalanobis distance based on the acquired quantity of state; and determining the state of the plant based on the calculated Mahalanobis distance and a predetermined threshold value. The third unit space is created based on the quantity of state of the plant during a period from the time that is a fifth time before the time when the state of the plant is evaluated to the time that is a sixth time before that time.

A second aspect of a plant state monitoring apparatus for monitoring an operation state of a plant according to the present invention at least includes: a unit space creating unit which creates a third unit space, which is a set of data serving as a standard for determining whether or not the state of the plant is normal or abnormal, based on the quantity of state of the plant during a period from the time that is a fifth time before the time when the state of the plant is evaluated to the time that is a sixth time before that time; a Mahalanobis distance calculating unit which calculates a Mahalanobis distance based on the quantity of state of the plant, acquired when the state of the plant is evaluated; and a plate state determining unit which determines the state of the plant based on the Mahalanobis distance calculated by the Mahalanobis distance calculating unit and a predetermined threshold value obtained from the third unit space created by the unit space creating unit.

As such, a unit space, which is a set of data serving as a standard for determining whether the state of the plant is normal or abnormal, is created based on the quantity of state of the plant during the period from the time that is a predetermined time before the time when the state of the plant is evaluated to the time that is a predetermined time before that time. In this way, the period for which information used to create the unit space is acquired is moved with the progress of evaluation. Therefore, even when the quantity of state is changed due to a variation in the performance of an apparatus over time in addition to season variations, it is possible to create the unit space in consideration of the influence of the variation. As a result, it is possible to prevent a reduction in the accuracy of determining the state of a gas turbine power generation plant and accurately determine whether the state of the gas turbine power generation plant is normal or abnormal. Here, a set of data, which is a standard for determining whether the state of the plant is normal or abnormal, is used to calculate the Mahalanobis distance or determine whether the plant is in a normal state or an abnormal state, and is called a unit space.

In the plant state monitoring method or the plant state monitoring apparatus, the quantity of state of the plant, at any time or a plurality of times in one solid day within the period for which the quantity of state is collected may be used as the quantity of state of the plant, that is, the quantity of state for creating a unit space, acquired during a period from the time that is a fifth time before the time when the state of the plant is evaluated to the time that is a sixth time before that time. In this way, it is possible to reduce the quantity of state of the plant used to create a unit space, which is a set of data serving as a standard for determining whether the state of the plant is normal or abnormal.

In the plant state monitoring method or the plant state monitoring apparatus according to the present invention, the previous quantities of state for creating a unit space are excluded in chronological order from the creation of the unit space, such that the oldest one is excluded first.

The period for which the quantity of state (the quantity of state for creating a unit space) used to create the unit space is acquired is moved with the progress of evaluation. That is, the period is moved over time. The quantity of state for creating a unit space corresponding to the time elapsed is excluded in chronological order from the creation of the unit space such that the oldest one is excluded first, and new unit space is created whenever the state of the plant is evaluated. As such, the period for which information (the quantity of state for creating a unit space) used to create the unit space is acquired is moved with the progress of evaluation, and old information is removed. Therefore, for example, even when the quantity of state is changed due to a variation in the state of parts, such as abrasion, over time, it is possible to create the unit space in consideration of the influence of the variation. As a result, even when the quantity of state is changed due to allowed and assumed factors, such as variation over time, in addition to a season variation, it is possible to accurately determine whether the state of a plant is normal or abnormal.

A second aspect of a plant state monitoring computer program according to the present invention is executed by a computer of a plant state monitoring apparatus which monitors an operation state of a plant. The plant state monitoring computer program allows the computer to create a third unit space, which is a set of data serving as a standard for determining whether or not the operation state of the plant is normal, based on the quantity of state of the plant during a period from the time that is a fifth time before the time when the state of the plant is evaluated to the time that is a sixth time before that time.

A third aspect of a plant state monitoring computer program according to the present invention is executed by a computer of a plant state monitoring apparatus which monitors an operation state of a plant using a Mahalanobis distance related to the quantity of state of the plant. The plant state monitoring computer program at least includes: acquiring from the plant the quantity of state for creating a unit space of the plant, which is used to create a third unit space which is a set of data serving as a standard for determining whether or not the operation state of the plant is normal; acquiring the quantity of state of the plant when the state of the plant is evaluated; calculating the Mahalanobis distance based on the acquired quantity of state; and determining the state of the plant based on the calculated Mahalanobis distance and a predetermined threshold value. The third unit space is created based on the quantity of state of the plant during a period from the time that is a fifth time before the time when the state of the plant is evaluated to the time that is a sixth time before that time.

Advantageous Effects

According to the invention, it is possible to accurately determine whether the operation state of a plant is normal or abnormal when a start operation is performed under operation conditions different from those when a rated load is applied, and when the performance of an apparatus decreases over time within an allowable range.

EXPLANATION OF REFERENCE

1 GAS TURBINE POWER GENERATION PLANT
2 COMPRESSOR
3 COMBUSTOR
4 TURBINE
5 POWER GENERATOR
6 GAS TURBINE
10 PLANT STATE MONITORING APPARATUS
11 INPUT/OUTPUT UNIT
12 PROCESSING UNIT
12a UNIT SPACE CREATING UNIT
12b MAHALANOBIS DISTANCE CALCULATING UNIT
12c PLANT STATE DETERMINING UNIT
13 STORAGE UNIT
14 CONTROL PANEL

BEST MODE FOR CARRYING OUT THE INVENTION (First Embodiment)

Hereinafter, a first embodiment of the invention will be described with reference to the accompanying drawings. The invention is not limited to the following exemplary embodiments (hereinafter, referred to as embodiments). The following embodiments include components that can be easily assumed by those skilled in the art, substantially the same components, and components in the equivalent range. In this embodiment, an example in which the invention is applied to a technique for monitoring the state of a gas turbine power generation plant will be described, but the invention is not limited thereto. For example, the invention can be applied to all plants requiring the monitoring of a plurality of state quantities, such as a nuclear power generation plant and a chemical plant.

This embodiment is characterized in that the entire gas turbine operation period is divided into two periods, that is, a start operation period (less than a rated speed) and a rated speed operation period (at least the rated speed; generally, a load operation), the quantity of state during each period is monitored, it is determined whether the state of a plant is normal or abnormal based on the Mahalanobis distance, and a unit space used to calculate the Mahalanobis distance or determine whether the state of the plant is normal or abnormal is created for each of the two operation periods, that is, the start operation period and the rated speed operation period, based on the quantity of state of the plant.

Figure 1:
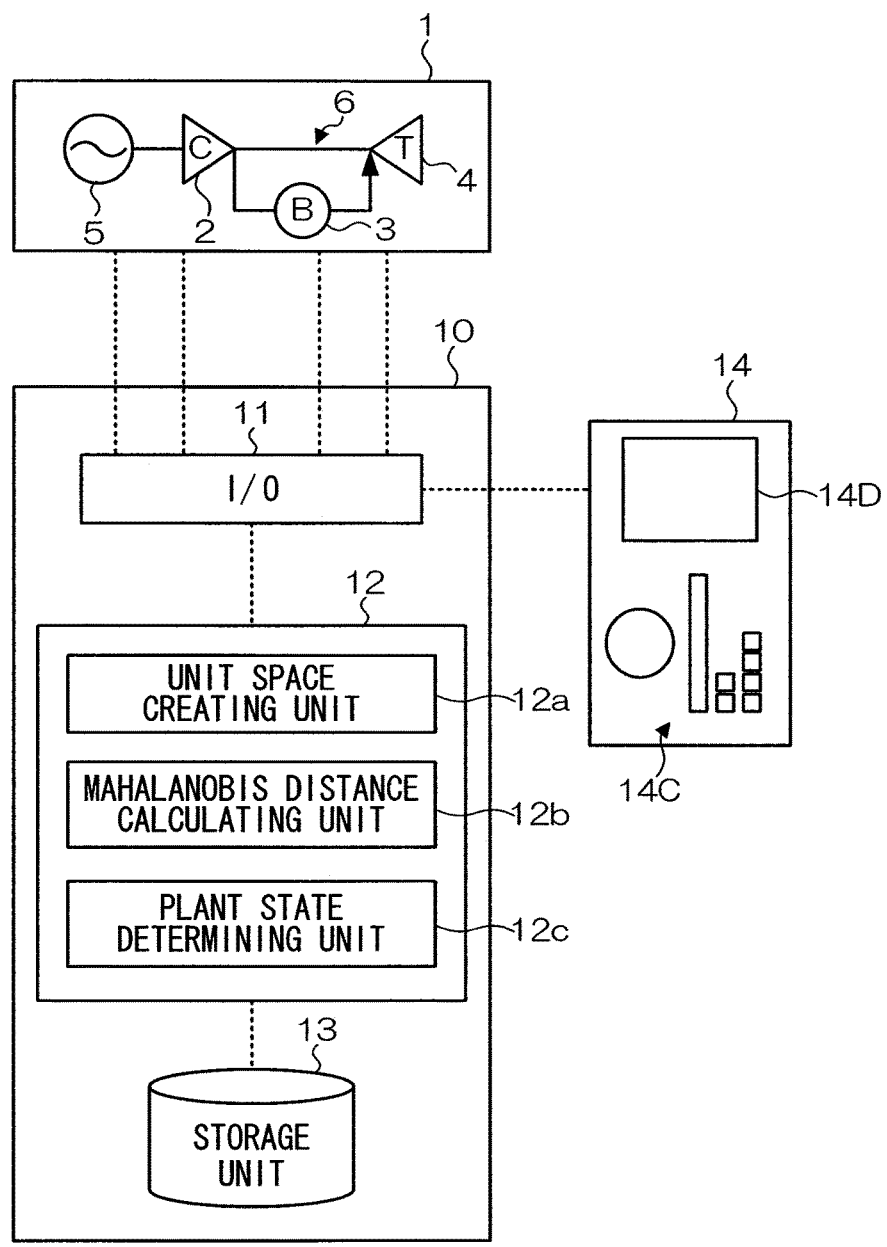
FIG. 1 is a diagram schematically illustrating an example of the structure of a plant state monitoring apparatus according to a first embodiment of the present invention.

FIG. 1 is a diagram schematically illustrating an example of the structure of a plant state monitoring apparatus according to this embodiment. A plant state monitoring apparatus 10 monitors the state (operation state) of a power generation plant (gas turbine power generation plant) 1 using a gas turbine 6 and determines whether or not the gas turbine power generation plant 1 is normally operated. If it is determined that the gas turbine power generation plant 1 is not normally operated, the plant state monitoring apparatus 10 notifies it or specifies the quantity of state that has been determined to be abnormal (for example, the temperature or pressure of each unit of the gas turbine 6).

The gas turbine power generation plant 1 to be monitored drives a power generator 5 using the gas turbine 6 to generate power. The gas turbine 6 includes a compressor 2, a combustor 3, and a turbine 4 that rotates the compressor 2. The compressor 2 compresses air drawn from an inlet of the compressor 2 to generate a high-temperature and high-pressure air and supplies the air to the combustor 3. In the combustor 3, fuel is supplied to the high-temperature and high-pressure air and is turned out. When the fuel is burned out in the combustor 3, a high-temperature and high-pressure combustion gas is generated and supplied to the turbine 4, and the turbine 4 is driven. In this way, the turbine 4 is rotated.

An output shaft of the gas turbine 6, that is, rotating shafts of the turbine 4 and the compressor 2 are connected to the power generator 5. Therefore, when the gas turbine 6 is operated to rotate the turbine 4, the output of the turbine is transmitted to the power generator 5. In this way, the gas turbine 6 drives the power generator 5 such that the power generator 5 generates power.

The plant state monitoring apparatus 10 monitors the state of the gas turbine power generation plant 1. In this embodiment, the plant state monitoring apparatus 10 monitors the state of one gas turbine power generation plant 1, but it may monitor the operation states of a plurality of gas turbine power generation plants 1. The plant state monitoring apparatus 10 is, for example, a computer and includes an input/output unit (I/O) 11, a processing unit 12, and a storage unit 13. The plant state monitoring apparatus 10 may be a so-called personal computer, or a combination of a CPU (Central Processing Unit) and a memory.

The processing unit 12 receives the quantity of state of the gas turbine power generation plant 1 from various kinds of state quantity detecting units (for example, sensors) that are attached to the gas turbine power generation plant 1 through the input/output unit 11. Various kinds of state quantity detecting units periodically acquire the corresponding quantities of state at a predetermined time interval from the start of an operation, and input the acquired quantities of state to the processing unit 12 through the input/output unit 11. The quantities of state of the gas turbine power generation plant 1 include, for example, the output of the power generator 5, the temperature of air drawn to the compressor 2, the temperature of each unit of the gas turbine 6, pressure, vibration, and a rotation speed. When the state of the gas turbine power generation plant 1 is monitored, for example, about 50 to 60 state quantities are used. The quantity of state of the gas turbine power generation plant 1 is transmitted to the processing unit 12 of the plant state monitoring apparatus 10 in the form of electric signals. The processing unit 12 includes, for example, a CPU and sequentially reads programs (computer program) or a sequence of call instructions from the storage unit 13, analyzes them, and moves or processes data based on the analysis result.

The processing unit 12 may be implemented by dedicated hardware. In addition, the following structure may be used: a computer program for implementing the function of the processing unit 12 is recorded on a computer-readable recording medium; and a computer system reads and executes the computer program recorded on the recording medium to perform the procedure of a plant state monitoring method according to this embodiment. The 'computer system' includes an OS and hardware, such as peripheral devices.

The 'computer-readable recording medium' means a portable medium, such as a flexible disk, a magneto-optical disk, a ROM, or a CD-ROM, or a recording device, such as a hard disk provided in the computer system. In addition, the 'computer-readable recording medium' includes a medium that dynamically stores a computer program in a short time, such as a communication line when the computer program is transmitted through the Internet or a communication line, such as a telephone line, and a medium that stores the computer program for a predetermined period of time, such as a volatile memory provided in a server or a computer system, serving as a client. The computer program may implement some of the above-mentioned functions, or it may be combined with the computer program recorded on the computer system to implement the above-mentioned functions.

The plant state monitoring method according to this embodiment may be performed by allowing a computer, such as a personal computer or a workstation, to execute the computer program. The computer program may be distributed through a communication line, such as the Internet. The computer program may be recorded on a computer readable recording medium, such as a hard disk, a flexible disk (FD), a CD-ROM, an MO, or a DVD, and the computer may read the computer program from the recording medium and execute it.

The processing unit 12 includes a unit space creating unit 12a, which is a unit space creating portion, a Mahalanobis distance calculating unit 12b, which is a Mahalanobis distance calculating portion, and a plant state determining unit 12c, which is a plant state determining portion. The functions of the plant state monitoring apparatus 10 according to this embodiment are implemented by the unit space creating unit 12a, the Mahalanobis distance calculating unit 12b, and the plant state determining unit 12c. The unit space creating unit 12a creates a unit space using the plant state monitoring method according to this embodiment from the electric signals related to the state of the gas turbine power generation plant 1, which are acquired through the input/output unit 11, based on a state value (state value for creating a unit space) for creating a Mahalanobis unit space. The unit space is a set of data, which is a standard for determining whether the state of the gas turbine power generation plant 1 is normal or abnormal. In this embodiment, a unit space for startup (that is, a first unit space), which is a set of data serving as a standard for determining whether the operation state of the gas turbine power generation plant 1 during the start operation period is normal or abnormal, is created based on the quantity of state of the plant during the start operation period. In addition, a unit space for a rated speed (that is, a second unit space), which is a set of data serving as a standard for determining whether the operation state of the gas turbine power generation plant 1 during the load operation period is normal or abnormal, is created based on the quantity of state of the plant during the load operation period.

The Mahalanobis distance calculating unit 12b calculates the Mahalanobis distance from the unit space created by the unit space creating unit 12a and the state value of the gas turbine power generation plant 1 acquired when the state of the gas turbine power generation plant 1 is evaluated. The plant state determining unit 12c determines the state of the gas turbine power generation plant 1 based on the Mahalanobis distance calculated by the Mahalanobis distance calculating unit 12b and a predetermined threshold value obtained from the unit space that is created by the unit space creating unit 12a.

A control panel 14, which is an output unit, is connected to the input/output unit 11 of the plant state monitoring apparatus 10. The control panel 14 includes a display 14D, which is a display unit, and an input unit 14C that is used to input instructions to the plant state monitoring apparatus 10.

The storage unit 13 of the plant state monitoring apparatus 10 includes, for example, a volatile memory, such as a RAM (Random Access Memory), a non-volatile memory, such as a ROM (Read Only Memory), a computer-readable storage medium, such as a hard disk device, a magneto-optical disk device, or a CD-ROM, or combinations thereof. The storage unit 13 stores, for example, data or a computer program for implementing the plant state monitoring method according to this embodiment. The processing unit 12 uses the computer program or the data to implement the plant state monitoring method according to this embodiment or control the operation of the gas turbine power generation plant 1. The storage unit 13 may be provided outside the plant state monitoring apparatus 10 and the plant state monitoring apparatus 10 may access the storage unit 13 through a communication line.

Figure 2:
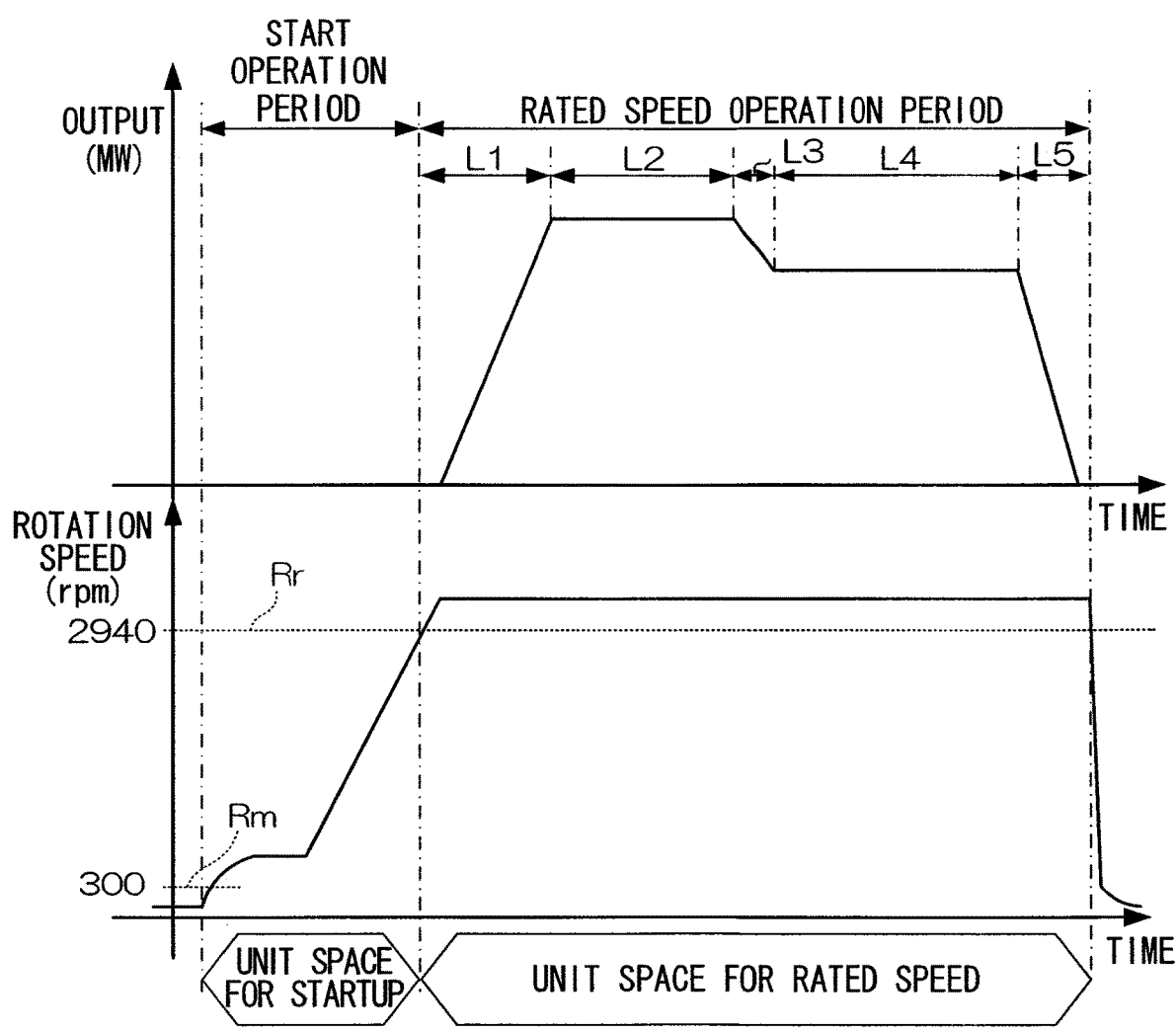
FIG. 2 is a conceptual diagram illustrating a unit space of a plant state monitoring method according to the first embodiment.

FIG. 2 is a conceptual diagram illustrating the unit space in the plant state monitoring method according to this embodiment. A lower side of the FIG. 2 shows an example of a variation in the rotation speed of the gas turbine over time, and an upper side thereof shows an example of a variation in the output of the power generator 5 over time. The gas turbine 6 is driven by a start motor. When the gas turbine 6 reaches a predetermined rotation speed, the fuel burned by the combustor 3 is supplied to the turbine 4 and the gas turbine 6 reaches a rated rotation speed while increasing the rotation speed. Then, the gas turbine 6 is operated while maintaining the rated rotation speed. In this case, the period over which the gas turbine 6 reaches the rated speed is referred to as the start operation period, and the period in which the gas turbine 6 is at a rated speed is referred to as the rated speed operation period.

In this embodiment, the unit spaces (the unit space for startup and the unit space for a rated speed) used to calculate the Mahalanobis distance or to determine whether the state of the plant is normal or abnormal are created from two operation periods, such as the start operation period and the rated speed operation period. In addition, data for creating a unit section is acquired from both during the load change periods L1, L3, and L5 for which the output shown on the upper side of FIG. 2 is changed and during the constant load periods L2 and L4 for which a substantially constant output is generated in the unit rated speed operation period, and the unit space is created on the acquired data (only the constant load periods L2 and L4 in the related art).

Figure 3:
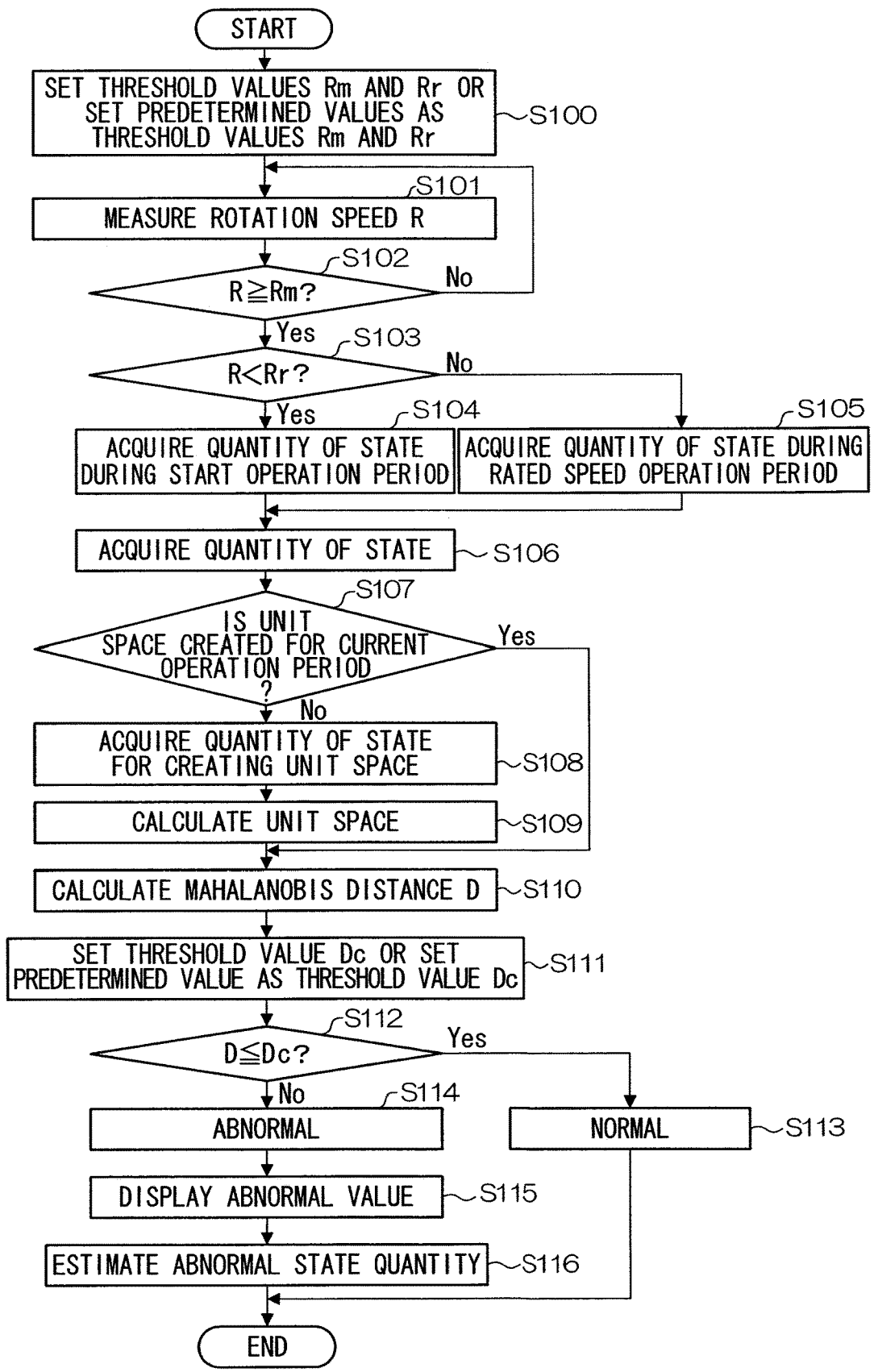
FIG. 3 is a flowchart illustrating the procedure of the plant state monitoring method according to the first embodiment.

FIG. 3 is a flowchart illustrating the procedure of the plant state monitoring method according to this embodiment.

Figure 4:
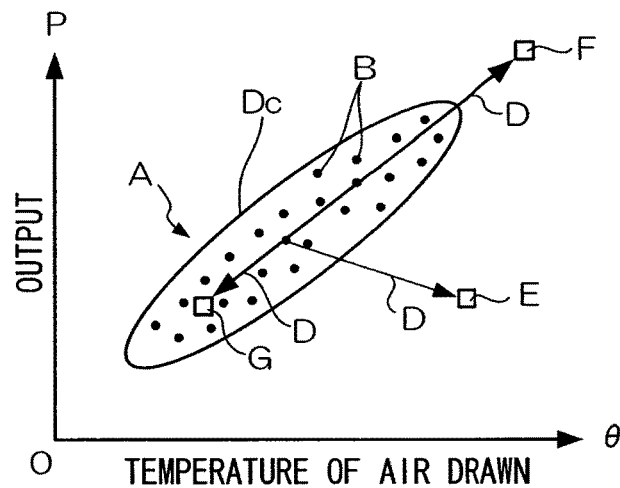
FIG. 4 is a conceptual diagram illustrating the concept of the Mahalanobis distance.
Figure 5:
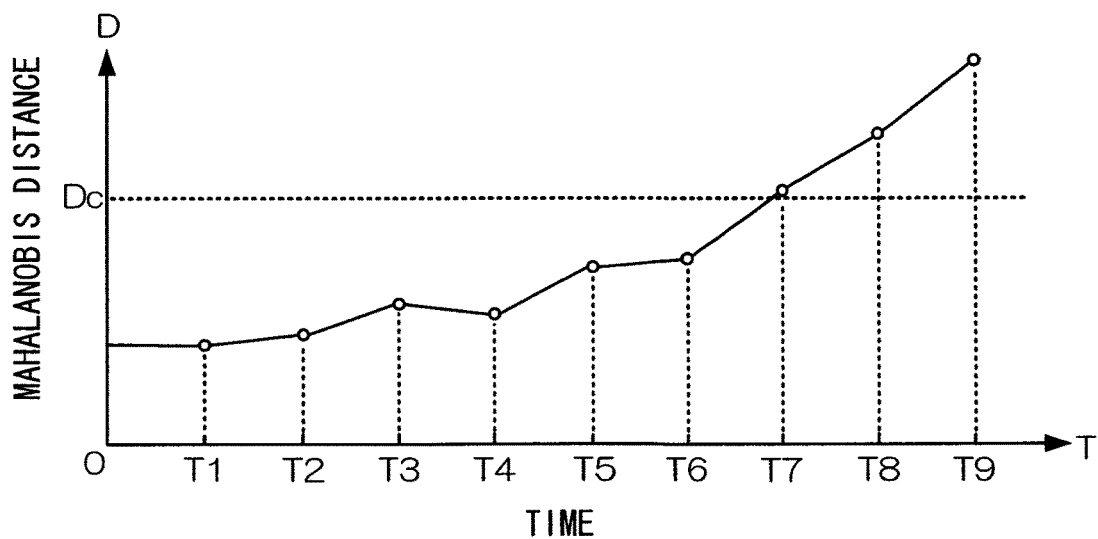
FIG. 5 is a conceptual diagram illustrating a variation in the Mahalanobis distance over time.
Figure 6:
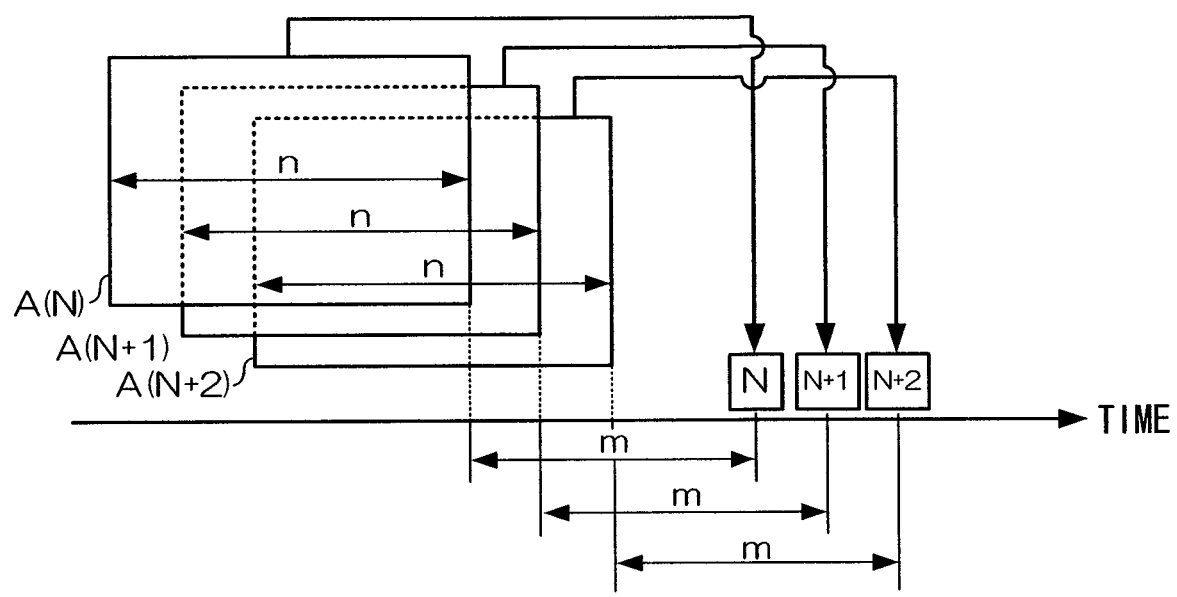
FIG. 6 is a conceptual diagram illustrating a method of creating the unit space in the plant state monitoring method according to the first embodiment.

FIG. 4 is a conceptual diagram illustrating the concept of the Mahalanobis distance. FIG. 5 is a conceptual diagram illustrating a variation in the Mahalanobis distance over time. FIG. 6 is a conceptual diagram illustrating a method of creating the unit space in the plant state monitoring method according to this embodiment. In the plant state monitoring method according to this embodiment, when it is determined whether the state of the gas turbine power generation plant 1 is normal or abnormal based on a plurality of state quantities, it is determined whether the state of the gas turbine power generation plant 1 is normal or abnormal based on the Mahalanobis distance. The Mahalanobis distance has been widely used as a factor for processing a plurality of variables (the quantities of state).

When it is determined whether the gas turbine power generation plant 1 is normal or abnormal based on the Mahalanobis distance, the Mahalanobis distance is used to convert multi-dimensional data into one-dimensional data. The difference between the unit space and a signal space (data other than the unit space: for example, the quantity of state when the state of the gas turbine power generation plant 1 is evaluated) is regarded as the Mahalanobis distance. In this embodiment, the Mahalanobis distance of the signal space is calculated by using the matrix formed from the unit space. In this way, it is possible to represent the abnormality of data. Next, the Mahalanobis distance will be described.

The total sum of a plurality of state quantities indicating the state of the gas turbine power generation plant 1 is u, each quantity of state is allocated to a variable X, and u quantities of state are defined by variables X1 to Xu (u is an integer at least 2). In the operation state of the gas turbine power generation plant 1, which is a reference, a total of v (2 or more) quantities of state (the quantities of state for creating a unit space) with variables X1 to Xu are collected. In this embodiment, the unit space for startup is created based on the quantity of state (that is, the quantity of state for creating a unit space) of the gas turbine power generation plant 1 collected during the period from the time that is a predetermined time (a first time) before the time when the state of the gas turbine power generation plant 1 is evaluated during the start operation of the gas turbine power generation plant 1 to the time that is a predetermined time (that is, a second time) before that time.

In addition, the unit space for a rated speed is created based on the quantity of state (that is, the quantity of state for creating a unit space) of the gas turbine power generation plant 1 collected during the period from the time that is a predetermined time (third time) before the time when the state of the gas turbine power generation plant 1 is evaluated during the rated speed operation of the gas turbine power generation plant 1 to the time that is a predetermined time (that is, a fourth time) before that time.

Therefore, the operation state of the gas turbine power generation plant 1 is acquired during the state quantity collection period from the time that is a predetermined time before the time when the state of the gas turbine power generation plant 1 is evaluated to the time that is a predetermined time before that time. In the following description, the unit space indicates the unit space for startup during the start operation period and the unit space for a rated speed during the rated speed operation period.

The average value Mi and the standard deviation σi (the degree of variation of reference data) of each of the variables X1 to Xu are calculated by the following Expressions 1 and 2. In Expressions 1 and 2, i indicates the number of items (the number of quantities of state: integer) and is set to 1 to u corresponding to the variables X1 to Xu, j is any one of 1 to v (integer), and v indicates the number of quantities of state. For example, when 60 quantities of state are acquired, v is 60. The standard deviation is the square root of an expectation value, which is the square of the difference between the quantity of state and the average value thereof.

$$M_i = \frac{1}{v}\sum_{j=1}^{v} X_{ij} \qquad \text{[Expression 1]}$$

$$\sigma_i = \sqrt{\frac{1}{v-1}\sum_{j=1}^{v}(X_{ij} - M_i)^2} \qquad \text{[Expression 2]}$$

Then, a standardizing process of converting the original variables X1 to Xu into x1 to xu based on the calculated average value Mi and standard deviation σi, which are the quantities of state indicating characteristics, using the following Expression 3 is performed. That is, the quantity of state of the gas turbine power generation plant 1 is converted into a random variable with an average of 0 and a standard deviation of 1. In the following Expression 3, j is any one of 1 to v (integer), and v indicates the number of quantities of state.

$$x_{ij}=(X_{ij}-M_i)/\sigma_i \quad \text{[Expression 3]}$$

Then, in order to perform analysis with data obtained by standardizing a variate into an average of 0 and a variance of 1, the correlation between the variables X1 to Xu, that is, a covariance matrix (correlation matrix) R indicating the relation between the variates, and an inverse matrix $R^{-1}$ of the covariance matrix (correlation matrix) are defined by the following Expression 4. In the following Expression 4, k indicates the number of items (the number of quantities of state) (in this embodiment, the number of items is u), and i and p each indicate the value of each quantity of state (in this embodiment, i and p are in the range of 1 to u).

$$R = \begin{pmatrix} 1 & r_{12} & \cdots & r_{1k} \\ r_{21} & 1 & \cdots & r_{2k} \\ \vdots & \vdots & \ddots & \vdots \\ r_{k1} & r_{k2} & \cdots & 1 \end{pmatrix} \quad \text{[Expression 4]}$$

$$R^{-1} = \begin{pmatrix} a_{11} & a_{12} & \cdots & a_{1k} \\ a_{21} & a_{22} & \cdots & a_{2k} \\ \vdots & \vdots & \ddots & \vdots \\ a_{k1} & a_{k2} & \cdots & a_{kk} \end{pmatrix} = \begin{pmatrix} 1 & r_{12} & \cdots & r_{1k} \\ r_{21} & 1 & \cdots & r_{2k} \\ \vdots & \vdots & \ddots & \vdots \\ r_{k1} & r_{k2} & \cdots & 1 \end{pmatrix}^{-1}$$

$$r_{ip} = r_{pi} = \frac{1}{v}\sum_{j=1}^{v} X_{ij}X_{pj}$$

After the above-mentioned calculation is performed, the Mahalanobis distance D, which is the quantity of state indicating characteristics, is calculated by the following Expression 5. In the following Expression 5, j is any one of 1 to v (integer), and v indicates the number of quantities of state. In addition, k indicates the number of items (the number of quantities of state) (in this embodiment, the number of items is u) and $a_{11}$ to $a_{kk}$ indicate coefficients of the inverse matrix $R^{-1}$ of the covariance matrix R in Expression 4.

$$D_j^2 = \frac{1}{k}(x_{ij}, x_{2j}, \ldots, x_{kj}) \cdot \begin{pmatrix} a_{11} & a_{12} & \cdots & a_{1k} \\ a_{21} & a_{22} & \cdots & a_{2k} \\ \vdots & \vdots & \ddots & \vdots \\ a_{k1} & a_{k2} & \cdots & a_{kk} \end{pmatrix}\begin{pmatrix} x_{1j} \\ x_{2j} \\ \vdots \\ x_{kj} \end{pmatrix} \quad \text{[Expression 5]}$$

$$= \frac{1}{k}\sum_{i=1}^{k}\sum_{p=1}^{k} a_{ip}x_{ij}x_{pj} = \frac{1}{k}(x_{1j}, x_{2j}, \ldots, x_{kj}) \cdot R^{-1} \cdot \begin{pmatrix} x_{1j} \\ x_{2j} \\ \vdots \\ x_{kj} \end{pmatrix}$$

The Mahalanobis distance D is substantially at most 4 when reference data, that is, the average value of the unit space is 1 and the quantity of state of the gas turbine power generation plant 1 is normal. However, when the quantity of state of the gas turbine power generation plant 1 is abnormal, the value of the Mahalanobis distance D is increased. As such, the value of the Mahalanobis distance D is increased according to the degree of abnormality of the quantity of state of the gas turbine power generation plant 1 (the distance from the unit space).

Next, the procedure of the plant state monitoring method according to this embodiment will be described. The plant state monitoring method according to this embodiment can be implemented by the plant state monitoring apparatus 10 shown in FIG. 1. First, as shown in FIG. 2, in Step S100, the plant state monitoring apparatus 10 sets threshold values Rm and Rr, or sets predetermined values as the threshold values Rm and Rr. In this embodiment, the threshold value Rm is 300 rpm, and the threshold value Rr is 2940 rpm. Then, the plant state monitoring apparatus 10 measures the rotation speed R in Step S101 and determines whether the rotation speed R is at most the threshold value Rm in Step S102. If it is determined that the rotation speed R is at least the threshold value Rm, the plant state monitoring apparatus 10 determines whether the measured rotation speed R is less than the threshold value Rr in Step S103. That is, the plant state monitoring apparatus 10 determines whether the operation period is the start operation period or the rated speed operation period shown in FIG. 2.

When the rotation speed R is not at least the threshold value Rm, the plant state monitoring apparatus 10 returns to Step S101 and measures the rotation speed R again. Then, the plant state monitoring apparatus 10 repeatedly performs the process of determining whether the operation period is the start operation period or the rated speed operation period. When the rotation speed R is at least the threshold value Rm and is less than the threshold value Rr, it is determined that the operation period is the start operation period. In Step S104, the quantity of state is acquired from the unit space for startup. When the rotation speed R is at least the threshold value Rm and is at least the threshold value Rr, it is determined that the operation period is the rated speed operation period. In Step S105, the quantity of state is acquired from the unit space for a rated speed. That is, in the following process, during the period for which the rotation speed R is at least the threshold value Rm and is less than the threshold value Rr, it is determined whether the state is normal or abnormal by the unit space for startup. During the period for which the rotation speed R is at least the threshold value Rr, it is determined whether the state is normal or abnormal based on the unit space for a rated speed.

In Step S106, the unit space creating unit 12a of the plant state monitoring apparatus 10 acquires the quantity of state of the gas turbine power generation plant 1 during the current state quantity acquisition period. The quantity of state of the gas turbine power generation plant 1 is acquired during an operation, but the quantity of state is not necessarily acquired during the operation of the gas turbine power generation plant 1. For example, the quantity of state is periodically acquired from various kinds of sensors that are attached to the gas turbine power generation plant 1 at a predetermined time interval and is then stored in the storage unit 13 of the plant state monitoring apparatus 10. Therefore, the quantity of state is acquired at a predetermined time interval during both the start operation period and the rated speed operation period after a startup and during both the load change periods L1, L3, and L5 and the constant load periods L2 and L4 in the rated speed operation period.

In Step S107, it is determined whether or not the unit space is created during the current operation period at the operation day. That is, when the quantity of state is acquired during the start operation period in Step S104 based on the determination results in Steps S102 and S103, it is determined whether the unit space for startup is created. When the unit space for startup is not created at the operation day, the process proceeds to Step S108. On the other hand, when the unit space for startup has already been created, the following Steps S108 and S109 are omitted and the process proceeds to Step S110. Similarly, when the quantity of state is acquired during the rated speed operation period in Step S105 based on the determination results in Steps S102 and S103, it is determined whether the unit space for a rated speed is created. When the unit space for a rated speed is not created, the process proceeds to Step S108. On the other hand, when the unit space for a rated speed has already been created, the process proceeds to Step S110.

When the unit space is not created during each operation period, in Step S108, the unit space creating unit 12a acquires the quantity of state for creating a unit space. That is, the unit space creating unit 12a acquires a unit space state quantity for startup during the start operation period and a unit space state quantity for a rated speed during the rated speed operation period. The quantity of state for creating a unit space is selected from the quantity of state of the gas turbine power generation plant 1 that has been acquired in Step S106 and stored in the storage unit 13. In this embodiment, the unit space for startup or the unit space for a rated speed is created based on the quantity of state of the gas turbine power generation plant 1 collected during the period from the time that is a predetermined time before the time when the state of the gas turbine power generation plant 1 is evaluated to the time that is a predetermined time before that time.

That is, the unit space for startup is created based on the quantity of state of the gas turbine power generation plant 1 collected during the period from the time that is a predetermined time (first time) before the time when the state of the gas turbine power generation plant 1 is evaluated during the start operation of the gas turbine power generation plant 1 to the time that is a predetermined time (second time) before the first time. In addition, the unit space for a rated speed is created based on the quantity of state of the gas turbine power generation plant 1 collected during the period from the time that is a predetermined time (third time) before the time when the state of the gas turbine power generation plant 1 is evaluated during the rated speed operation of the gas turbine power generation plant 1 to the time that is a predetermined time (that is, a fourth time) before the third time.

For example, the time when the state of the gas turbine power generation plant 1 is evaluated (referred to as 'during evaluation') is an N-th day shown in FIG. 6, one predetermined time (the first time or the third time) is m days, and the other predetermined time (the second time or the fourth time) is n days. It is assumed that the period from the time that is m days before the evaluation to the time that is n days before that time is referred to as a period for which the quantity of state of the gas turbine power generation plant 1 is collected. In this case, a unit space A(N) is created based on the quantity of state of the gas turbine power generation plant 1 acquired for n days from the time that is m+n days before the N-th day to the time that is m days before the N-th day. Similarly, when the evaluation is performed at an (N+1)-th day, a unit space A(N+1) is created based on the quantity of state of the gas turbine power generation plant 1 acquired for n days from the time that is m+n days before the (N+1)-th day to the time that is m days before the (N+1)-th day. When the evaluation is performed at an (N+2)-th day, a unit space A(N+2) is created based on the quantity of state of the gas turbine power generation plant 1 acquired for n days from the time that is m+n days before the (N+2)-th day to the time that is m days before the (N+2)-th day.

When the N-th day is a reference point and the evaluation is performed at the (N+1)-th day, the unit space A(N+1) is created based on the quantity of state of the gas turbine power generation plant 1 acquired for n days from the time that is (m+n−1) days before the N-th day to the time that is m days before the (N+1)-th day. When the evaluation is performed at an (N+2)-th day, a unit space A(N+2) is created based on the quantity of state of the gas turbine power generation plant 1 acquired for n days from the time that is (m+n−2) days before the N-th day to the time that is m days before the (N+2)-th day.

For example, when predetermined m+n days have not elapsed from the day at which the gas turbine power generation plant 1 was installed and operated, it is difficult to perform the above-mentioned process to create the unit space. Therefore, in this case, until n days have elapsed from the start of the operation, the unit space may be created based on the quantity of state acquired each day. In addition, until n days or more, for example, m+n days have elapsed, the unit space may be created based on the quantity of state acquired during the period from the day at which the operation starts to n days.

In this embodiment, the unit space is created based on the quantity of state acquired during a predetermined period (in this embodiment, n days) before the evaluation. In the creation of the unit space, new quantity of state is acquired as data every day over time. In addition, when a time corresponding to the evaluation has elapsed, the previous quantities of state are sequentially removed in chronological order from the creation of the unit space. As described above, when evaluation is performed at the N-th day, the unit space A(N) is created based on the quantity of state of the gas turbine power generation plant 1 acquired for n days from the time that is m days before the evaluation to the time that is n days before that time. When evaluation is performed at the (N+1)-th day after one full day (24 hours) has elapsed from the N-th day, the unit space A(N+1) is created based on the quantity of state of the gas turbine power generation plant 1 acquired for n days from the time that is m−1 days before the N-th day to the time that is n days before that time. That is, when the evaluation time is changed from the N-th day to the (N+1)-th day, the quantity of state that has not been collected at the N-th day where the evaluation is performed, that is, the quantity of state collected for one day from the time that is m−1 days before the N-th day to the time that is one day before that time is used to create the unit space A(N+1). In addition, the quantity of state that has been collected at the N-th day where the evaluation is performed, that is, the quantity of state collected for one day from the time that is (m+n−1) days before the N-th day to the time that is one day before that time is removed from the creation of the unit space A(N+1).

As such, in this embodiment, the period for which the state value (the quantity of state for creating a unit space) used to create the unit space is acquired is moved with the progress of evaluation, and a new unit space is created whenever the state of the gas turbine power generation plant 1 is evaluated. As such, the period for which information used to create the unit space is acquired is moved with the progress of evaluation. Therefore, even when the quantity of state is changed due to a variation in the performance of parts, such as abrasion, over time in addition to a season variation, it is possible to create the unit space in consideration of the influence of the variation. As a result, even when the quantity of state is changed due to allowed and assumed factors, such as a variation in performance over time, in addition to the season variation, it is possible to prevent a reduction in the accuracy of the determination of the state of the gas turbine power generation plant 1 and accurately determine whether the state of the gas turbine power generation plant 1 is normal or abnormal.

In the above Patent Citation 1, a plurality of unit spaces is prepared for each season. However, for example, when abnormal weather conditions, such as cold summer and warm winter, occur, it is difficult to reflect the influence of the abnormal weather conditions to the unit space. As a result, in the technique disclosed in the above Patent Citation 1, the accuracy of the determination of the state of the gas turbine power generation plant 1 is lowered, and a normal state is likely to be determined to be an abnormal state. In this embodiment, since the period for which information used to create the unit space is moved with the progress of the evaluation, it is possible to reflect the influence of, for example, the abnormal weather conditions to the unit space. As a result, it is possible to prevent a reduction in the accuracy of the determination of the state of the gas turbine power generation plant 1 and accurately determine whether the state of the gas turbine power generation plant 1 is normal or abnormal.

In addition, in the above Patent Citation 1, it is necessary to prepare a plurality of unit spaces for each season. However, in this embodiment, since the period for which the quantity of state (the quantity of state for creating a unit space) used to create the unit space is moved with the progress of evaluation, it is not necessary to prepare a plurality of unit spaces. Therefore, it is possible to reduce the storage area of the unit space in the storage unit 13 provided in the plant state monitoring apparatus 10. As a result, it is possible to effectively use the hardware resources of the plant state monitoring apparatus 10. In this embodiment, since a new unit space is created whenever the gas turbine power generation plant 1 is evaluated, it is possible to create a unit space for each plant. As a result, it is possible to evaluate the state of each plant in consideration of the characteristics of the plant, which results in an increase in the accuracy of evaluation.

It is preferable that n be at least 30 days and at most 80 days. In this embodiment, n is 60 days. In addition, it is preferable that m be at least 3 days and at most 10 days. In this embodiment, m is 10 days.

In this embodiment, the period for which the quantity of state (the quantity of state for creating a unit space) used to create the unit space is moved with the progress of evaluation. When the quantity of state of the gas turbine power generation plant 1 is gradually changed to an abnormal state and the evaluation operation is included in the period, the creation of the unit space is affected by an abnormal state quantity. As a result, the accuracy of the determination of the state of the gas turbine power generation plant 1 is likely to be reduced. In this embodiment, the state value acquired during a predetermined period before evaluation (in this embodiment, for m days before the evaluation) is not used to create the unit time. In this way, the creation of the unit space is less affected by an abnormal state quantity. Therefore, the accuracy of the determination of the state of the gas turbine power generation plant 1 is less likely to be reduced. As a result, even though abnormality in the quantity of state of the gas turbine power generation plant 1 gradually occurs, it is possible to detect the abnormality.

When the quantity of state for creating a unit space is acquired by the above-mentioned method, the process proceeds to Step S109.

In Step S109, the unit space creating unit 12a calculates a unit space (that is, the unit space for startup during the start operation period and the unit space for a rated speed during the rated speed operation period) from the quantity of state for creating a unit space acquired in Step S108. In this embodiment, the number of quantities of state is u, and the unit space is a u-dimensional space. Then, the process proceeds to Step S110, and the Mahalanobis distance calculating unit 12b of the plant state monitoring apparatus 10 calculates the Mahalanobis distance D during evaluation.

The Mahalanobis distance D is calculated by Expression 5. In this case, the inverse matrix $R^{-1}$ of the covariance matrix R in Expression 5 is calculated from data (the quantity of state) of the unit space calculated in Step S109. That is, the Mahalanobis distance D is calculated based on the unit space for startup or the unit space for a rated speed that is calculated from the start operation period or the load operation period, which is a target. In Expression 5, $x_{kj}$ is obtained by converting a variable $X_{kj}$ allocated to the quantity of state of the gas turbine power generation plant 1 acquired during evaluation into the random variable of the standard deviation 1 using Expression 3. Here, k indicates the number (u) of quantities of state, and j indicates the number of quantities of state of the gas turbine power generation plant 1 acquired during evaluation.

Then, the process proceeds to Step S111 and the threshold value Dc is set. In this case, the order of Step S110 and Step S111 may be changed. As described above, the Mahalanobis distance D is increased as the distance from the unit space is increased, that is, according to the degree of abnormality. The Mahalanobis distance D is substantially at most 4 when the reference data, that is, the average value of the unit space is 1 and the quantity of state of the gas turbine power generation plant 1 is a normal state. Therefore, for example, the threshold value Dc may be appropriately set to a value that is more than the maximum value of the unit space. In addition, the threshold value Dc may be set in consideration of inherent characteristics of the gas turbine power generation plant 1 or a variation in the manufacture of the gas turbine power generation plant 1. The threshold value Dc may be a predetermined value.

FIG. 4 is a diagram illustrating a unit space A created using the output P of the power generator 5 and the temperature θ of the air drawn into the compressor 2 as the quantity of state for creating a unit space. In FIG. 4, B indicates the quantity of state, that is, the measured values of the output P of the power generator 5 and the temperature θ of the air drawn into the compressor 2. A solid line indicating the unit space A indicates the threshold value Dc. In addition, D indicates the Mahalanobis distance. When the quantity of state (in FIG. 4, the output P and the temperature θ of the air drawn) during evaluation is within the threshold value Dc (G in FIG. 4), it can be determined that the gas turbine power generation plant 1 is in a normal state. When the quantity of state during evaluation is more than the threshold value Dc (E and F in FIG. 4), it can be determined that the gas turbine power generation plant 1 is in an abnormal state. In FIG. 5, since D<Dc is satisfied up to a time T=T6, it is determined that the gas turbine power generation plant 1 is in a normal state. However, since D>Dc is satisfied at a time T=T7, it is determined that the gas turbine power generation plant 1 is in an abnormal state.

In Step S112, the plant state determining unit 12c of the plant state monitoring apparatus 10 compares the Mahalanobis distance D acquired in Step S110 with the threshold value Dc set in Step S111. When the determination result in Step S112 is "Yes", that is, when the plant state determining unit 12c determines that the Mahalanobis distance D is at most the threshold value Dc, it is determined that the gas turbine power generation plant 1 is in a normal state (Step S113).

When the determination result in Step S112 is "No", that is, when the plant state determining unit 12c determines that the Mahalanobis distance D is more than the threshold value Dc, it is determined that the gas turbine power generation plant 1 is in an abnormal state (Step S114). In this case, the process proceeds to Step S115, and the plant state determining unit 12c displays the Mahalanobis distance D that has been determined to be abnormal on the display 14D of the control panel 14. The displayed Mahalanobis distance D is calculated in Step S110.

Then, the process proceeds to Step S116, and the plant state determining unit 12c estimates the items of abnormal state quantities from the difference between the larger-the-better SN ratios according to whether or not there are items by, for example, orthogonal table analysis. Whether or not there is an abnormality can be determined from the Mahalanobis distance D. However, it is difficult to determine a place where an abnormality occurs from the Mahalanobis distance D. It is easy to specify the place where an abnormality occurs or clear up the cause of the abnormality by estimating the items of abnormal state quantities. The plant state determining unit 12c displays the estimated abnormal state quantities on the display 14D of the control panel 14. The difference between the larger-the-better SN ratios according to whether there are items by the orthogonal table analysis is increased in the quantity of state of the abnormal item. Therefore, it is possible to specify abnormal factors by checking the items with a large difference between the larger-the-better SN ratios, for example, the top three items. Steps S101 to S116 are repeatedly performed at a predetermined time interval until the operation of the gas turbine ends.

According to the above-described embodiment, in different operation conditions, different unit spaces are created from the quantities of state corresponding to the start operation period and the rated speed operation period. When the Mahalanobis distance is calculated, and when it is determined whether the state of the plant is normal or abnormal based on the calculated Mahalanobis distance, one of two unit spaces is selected according to whether the period during evaluation is the start operation period or the rated speed operation period, the Mahalanobis distance is calculated, and it is determined whether the state of the plant is normal or abnormal. Therefore, it is possible to accurately determine whether the state of the plant is normal or abnormal both during the start of the operation and during the application of a rated load with different operation conditions. During the rated speed operation period, data is collected from both a case in which a load varies and a case in which a constant load is applied. In this way, even when the output varies depending on an output demand during the rated speed operation period, it is possible to stably operate a plant using the unit space created from the data, without an erroneous determination.

As described above, the quantity of state is periodically acquired at a predetermined time interval from the start of the operation, and it is determined whether the acquired quantity of state is applied to the start operation period or the rated speed operation period based on the rotation speed when the quantity of state is acquired. Then, the unit space is created based on the determination result, In addition, the Mahalanobis distance is calculated and it is determined whether the state of the plant is normal or abnormal. That is, it is possible to acquire the quantity of state only by collecting data without designating a predetermined time or a predetermined number of rotations to acquire data and without discriminating the start operation period from the rated speed operation period. Therefore, it is possible to reduce the load in the collection of data. During both the start operation period and the rated speed operation period and during the rated speed operation period, it is possible to collect a set of data at a predetermined time interval such that the set of data includes data when a load varies and data when a constant load is applied. In this way, it is possible to appropriately create unit spaces corresponding to each period.

In addition, the unit space used to calculate the Mahalanobis distance or determine whether the plant is in a normal state or an abnormal state is created based on the quantity of state of the plant acquired during the period from the time that is a predetermined time before the time when the state of the plant is evaluated to the time that is a predetermined time before that time. In this way, the period for which information used to create the unit space is acquired is moved with the progress of evaluation. Therefore, even when the quantity of state is changed due to an allowed and assumed factor, for example, variation over time, in addition to a season variation, it is possible to create the unit space in consideration of the influence of the variation. As a result, it is possible to reflect factors causing a variation in the quantity of state to the unit space. In this way, it is possible to prevent the accuracy of the determination of the state of a gas turbine power generation plant from being reduced and accurately determine whether the gas turbine power generation plant is in a normal state or an abnormal state.

(Second Embodiment)

Next, a second embodiment of the invention will be described with reference to the drawings. A description of the same structure and components as those in the first embodiment will be omitted. The invention is not limited to exemplary embodiments (hereinafter, referred to as embodiments). The following embodiment includes components that can be easily assumed by those skilled in the art, substantially the same components, and components in the equivalent range. In this embodiment, an example in which the invention is applied to a technique for monitoring the state of a gas turbine power generation plant will be described, but the invention is not limited thereto. For example, the invention can be applied to all plants requiring the monitoring of a plurality of state quantities, such as a nuclear power generation plant and a chemical plant.

In this embodiment, it is determined whether the state of a plant is normal or abnormal based on the Mahalanobis distance described in the first embodiment. In particular, a unit space (that is, a third unit space) used to calculate the Mahalanobis distance or determine whether the plant is in a normal state or an abnormal state is created based on the quantity of state (that is, the quantity of state for creating a unit space) of the gas turbine power generation plant 1 during the period from the time that is a predetermined time (that is, a fifth time) before the time when the state of the gas turbine power generation plant 1 is evaluated to the time that is a predetermined time (that is, a sixth time) before the fifth time (a detailed description of the Mahalanobis distance will be omitted).

Next, the procedure of a plant state monitoring method according to this embodiment will be described. The plant state monitoring method according to this embodiment is implemented by the plant state monitoring apparatus 10 shown in FIG. 1 (a detailed description of the plant state monitoring apparatus will be omitted).

Figure 7:
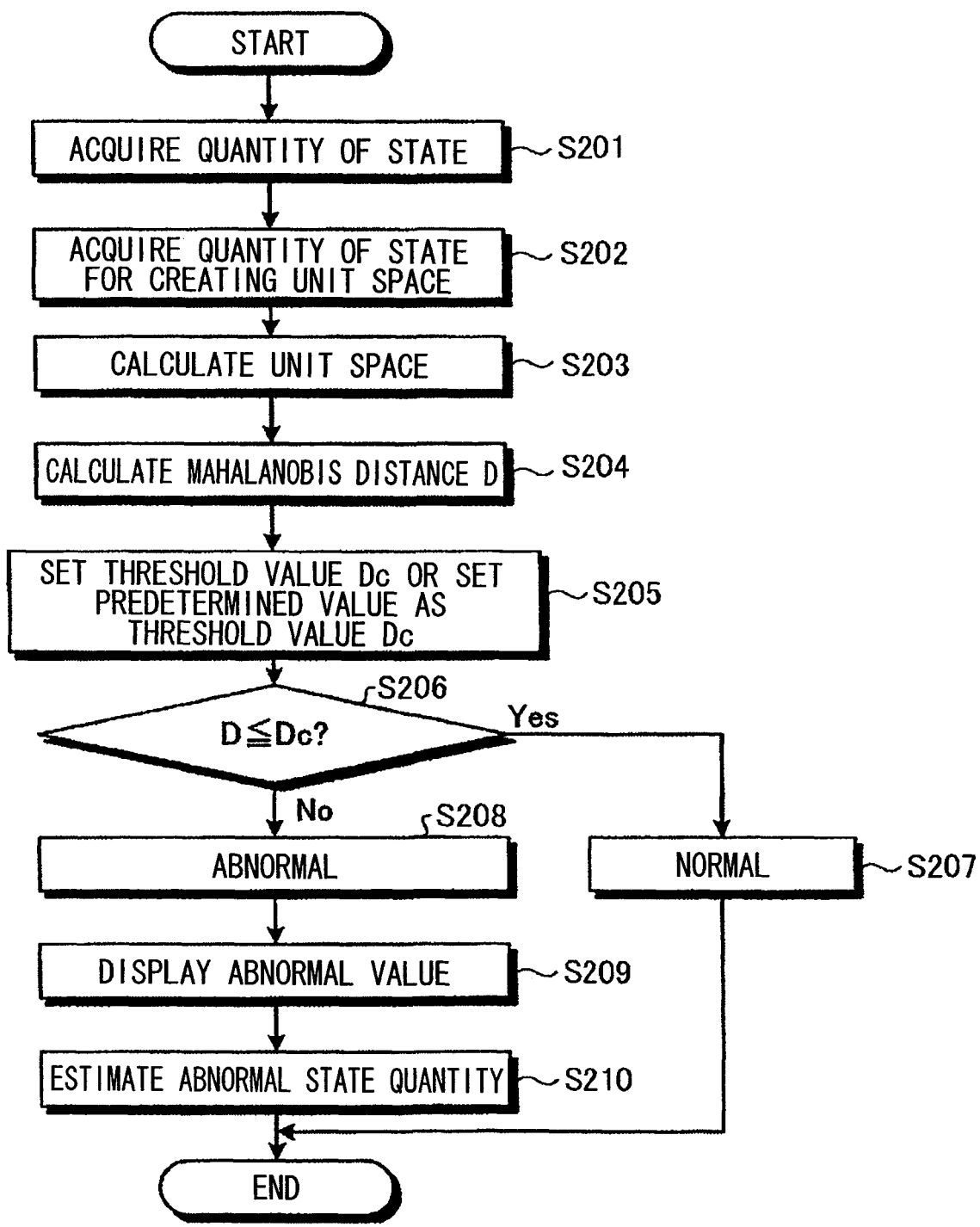
FIG. 7 is a flowchart illustrating the procedure of a plant state monitoring method according to a second embodiment.

FIG. 7 is a flowchart illustrating the procedure of the plant state monitoring method according to this embodiment.

First, as shown in FIG. 7, in Step S201, the unit space creating unit 12a of the plant state monitoring apparatus 10 acquires the quantity of state of the gas turbine power generation plant 1. The quantity of state of the gas turbine power generation plant 1 is acquired during an operation, but the quantity of state is not necessarily acquired during the operation of the gas turbine power generation plant 1. For example, the quantity of state is periodically acquired from various kinds of sensors attached to the gas turbine power generation plant 1 at a predetermined time interval and is then stored in the storage unit 13 of the plant state monitoring apparatus 10.

Then, the process proceeds to Step S202, and the unit space creating unit 12a acquires the quantity of state for creating a unit space. The quantity of state for creating a unit space is selected from the quantity of state of the gas turbine power generation plant 1 that has been acquired in Step S201 and stored in the storage unit 13. In this embodiment, the unit space is created based on the quantity of state of the gas turbine power generation plant 1 collected during the period from the time that is a predetermined time before the time when the state of the gas turbine power generation plant 1 is evaluated to the time that is a predetermined time before that time.

For example, the time when the state of the gas turbine power generation plant 1 is evaluated (referred to as during evaluation) is an N-th day shown in FIG. 6, one predetermined time (the fifth time) is m days, and the other predetermined time (the sixth time) is n days. It is assumed that the period from the time that is m days before the evaluation to the time that is n days before that time is referred to as a period for which the quantity of state of the gas turbine power generation plant 1 is collected. In this case, a unit space A(N) is created based on the quantity of state of the gas turbine power generation plant 1 acquired for n days from the time that is m+n days before the N-th day to the time that is m days before the N-th day. Similarly, when the evaluation is performed at an (N+1)-th day, a unit space A(N+1) is created based on the quantity of state of the gas turbine power generation plant 1 acquired for n days from the time that is m+n days before the (N+1)-th day to the time that is m days before the (N+1)-th day. When the evaluation is performed at an (N+2)-th day, a unit space A(N+2) is created based on the quantity of state of the gas turbine power generation plant 1 acquired for n days from the time that is m+n days before the (N+2)-th day to the time that is m days before the (N+2)-th day.

When the N-th day is a reference point and the evaluation is performed at the (N+1)-th day, the unit space A(N+1) is created based on the quantity of state of the gas turbine power generation plant 1 acquired for n days from the time that is (m+n−1) days before the N-th day to the time that is m days before the (N+1)-th day. When the evaluation is performed at an (N+2)-th day, the unit space A(N+2) is created based on the quantity of state of the gas turbine power generation plant 1 acquired for n days from the time that is (m+n−2) days before the N-th day to the time that is m days before the (N+2)-th day.

In this embodiment, the unit space is created based on the quantity of state acquired during a predetermined period (in this embodiment, n days) before evaluation. In the creation of the unit space, new quantity of state is acquired as data every day over time. In addition, when a time corresponding to the evaluation has elapsed, the past quantity of state is sequentially removed from the creation of the unit space. As described above, when the evaluation is performed at the N-th day, the unit space A(N) is created based on the quantity of state of the gas turbine power generation plant 1 acquired for n days from the time that is m days before the evaluation to the time that is n days before that day. When the evaluation is performed at the (N+1)-th day after one full day (24 hours) has elapsed from the N-th day, the unit space A(N+1) is created based on the quantity of state of the gas turbine power generation plant 1 acquired for n days from the time that is m−1 days before the N-th day to the time that is n days before that day. That is, when the evaluation time is changed from the N-th day to the (N+1)-th day, the quantity of state that has not been collected at the N-th day where the evaluation is performed, that is, the quantity of state collected for one day from the time that is m−1 days before the N-th day to the time that is one day before that time is used to create the unit space A(N+1). In addition, the quantity of state that has been collected at the N-th day where the evaluation is performed, that is, the quantity of state collected for one day from the time that is (m+n−1) days before the N-th day to the time that is one day before that time is removed from the creation of the unit space A(N+1).

As such, in this embodiment, the period for which the state value (the quantity of state for creating a unit space) used to create the unit space is acquired is moved with the progress of evaluation, and new unit space is created whenever the state of the gas turbine power generation plant 1 is evaluated. As such, the period for which information used to create the unit space is acquired is moved with the progress of evaluation. Therefore, even when the quantity of state is changed due to a variation in the state of parts, such as abrasion, over time in addition to a season variation, it is possible to create the unit space in consideration of the influence of the variation. As a result, even when the quantity of state is changed due to allowed and assumed factors, such as a variation in performance over time, in addition to the season variation, it is possible to prevent a reduction in the accuracy of the determination of the state of the gas turbine power generation plant 1 and accurately determine whether the state of the gas turbine power generation plant 1 is normal or abnormal.

In the above Patent Citation 1, a plurality of unit spaces is prepared for each season. However, for example, when abnormal weather conditions, such as cold summer and warm winter, occur, it is difficult to reflect the influence of the abnormal weather conditions to the unit space. As a result, in the technique disclosed in the above Patent Citation 1, the accuracy of the determination of the state of the gas turbine power generation plant 1 is lowered, and a normal state is likely to be determined to be an abnormal state. In this embodiment, since the period for which information used to create the unit space is moved with the progress of evaluation, it is possible to reflect the influence of, for example, the abnormal weather conditions to the unit space. As a result, it is possible to prevent a reduction in the accuracy of the determination of the state of the gas turbine power generation plant 1 and accurately determine whether the state of the gas turbine power generation plant 1 is normal or abnormal.

In addition, in the above Patent Citation 1, it is necessary to prepare a plurality of unit spaces for each season. However, in this embodiment, since the period for which the quantity of state (the quantity of state for creating a unit space) used to create the unit space is moved with the progress of evaluation, it is not necessary to prepare a plurality of unit spaces. Therefore, it is possible to reduce the storage area of the unit space in the storage unit 13 provided in the plant state monitoring apparatus 10. As a result, it is possible to effectively use the hardware resources of the plant state monitoring apparatus 10. In this embodiment, since a new unit space is created whenever the gas turbine power generation plant 1 is evaluated, it is possible to create a unit space for each plant. As a result, it is possible to evaluate the state of each plant in consideration of the characteristics of the plant, which results in an increase in the accuracy of evaluation.

It is preferable that information acquired at any time of one day be used as the quantity of state, which is the quantity of state for creating a unit space use. In this case, only one state quantity or m state quantities are used as information for creating a unit time. Therefore, it is possible to reduce the amount of information for creating a unit time. In this way, it is possible to reduce the operation load of the processing unit 12 provided in the plant state monitoring apparatus 10 and the storage area of the information for creating a unit time in the storage unit 13. As a result, it is possible to effectively use the hardware resources of the plant state monitoring apparatus 10. It is preferable that n be at least 30 days and at most 80 days. In this embodiment, n is 60 days. In addition, it is preferable that m be at least 3 days and at most 10 days. In this embodiment, m is 10 days. Information at a plurality of times of one day may be used as the quantity of state, which is the quantity of state for creating a unit space.

In this embodiment, the period for which the quantity of state (the quantity of state for creating a unit space) used to create the unit space is moved with the progress of evaluation. When the quantity of state of the gas turbine power generation plant 1 is gradually changed to an abnormal state and the evaluation operation is included in the period, the creation of the unit space is affected by an abnormal state quantity. As a result, the accuracy of the determination of the state of the gas turbine power generation plant 1 is likely to be reduced. In this embodiment, the state value acquired during a predetermined period before the evaluation (in this embodiment, for m days before the evaluation) is not used to create the unit time. In this way, the creation of the unit space is less affected by an abnormal state quantity. Therefore, the accuracy of the determination of the state of the gas turbine power generation plant 1 is less likely to be reduced. As a result, even though abnormality in the quantity of state of the gas turbine power generation plant 1 gradually appears, it is possible to detect the abnormality.

When the quantity of state for creating a unit space is acquired by the above-mentioned method, the process proceeds to Step S203. In Step S203, the unit space creating unit 12a calculates a unit space from the quantity of state for creating a unit space acquired in Step S202. In this embodiment, the number of quantities of state is L, and the unit space is an L-dimensional space. Then, the process proceeds to Step S204, and the Mahalanobis distance calculating unit 12b of the plant state monitoring apparatus 10 calculates the Mahalanobis distance D during evaluation.

The Mahalanobis distance D is calculated by Expression 5. In this case, the inverse matrix $R^{-1}$ of the covariance matrix R in Expression 5 is calculated from data (the quantity of state) of the unit space calculated in Step S203. That is, the Mahalanobis distance D is calculated based on the unit space. In Expression 5, $x_{kj}$ is obtained by converting a variable $X_{kj}$ allocated to the quantity of state of the gas turbine power generation plant 1 acquired during evaluation into the random variable of the standard deviation 1 using Expression 3. Here, k indicates the number (u) of quantities of state, and j indicates the number of quantities of state of the gas turbine power generation plant 1 acquired during evaluation.

Then, the process proceeds to Step S205 and the threshold value Dc is set. In this case, the order of Step S204 and Step S205 may be changed. As described above, the Mahalanobis distance D is increased as the distance from the unit space is increased, that is, according to the degree of abnormality. The Mahalanobis distance D is substantially at most 4 when reference data, that is, the average value of the unit space is 1 and the quantity of state of the gas turbine power generation plant 1 is a normal state. Therefore, for example, the threshold value Dc may be appropriately set to a value that is more than the maximum value of the unit space. In addition, the threshold value Dc may be set in consideration of inherent characteristics of the gas turbine power generation plant 1 or a variation in the manufacture of the gas turbine power generation plant 1. The threshold value Dc may be a predetermined value.

FIG. 4 is a diagram illustrating the unit space A created using the output P of the power generator 5 and the temperature θ of the air drawn into the compressor 2 as the quantity of state for creating a unit space. In FIG. 4, B indicates the quantity of state, that is, the measured values of the output P of the power generator 5 and the temperature θ of the air drawn into the compressor 2. A solid line indicating the unit space A indicates the threshold value Dc. In addition, D indicates the Mahalanobis distance. When the quantity of state (in FIG. 4, the output P and the temperature θ of the air drawn) during evaluation is within the threshold value Dc (G in FIG. 4), it can be determined that the gas turbine power generation plant 1 is in a normal state. When the quantity of state during evaluation is more than the threshold value Dc (E and F in FIG. 4), it can be determined that the gas turbine power generation plant 1 is in an abnormal state. In FIG. 5, since D<Dc is satisfied up to a time T=T6, it is determined that the gas turbine power generation plant 1 is in a normal state. However, since D>Dc is satisfied at a time T=T7, it is determined that the gas turbine power generation plant 1 is in an abnormal state.

In Step S206, the plant state determining unit 12c of the plant state monitoring apparatus 10 compares the Mahalanobis distance D acquired in Step S204 with the threshold value Dc set in Step S205. When the determination result in Step S206 is "Yes", that is, when the plant state determining unit 12c determines that the Mahalanobis distance D is at most the threshold value Dc, it is determined that the gas turbine power generation plant 1 is in a normal state (Step S207). In this case, the plant state monitoring method according to this embodiment is concluded.

When the determination result in Step S206 is "No", that is, when the plant state determining unit 12c determines that the Mahalanobis distance D is more than the threshold value Dc, it is determined that the gas turbine power generation plant 1 is in an abnormal state (Step S208). In this case, the process proceeds to Step S209, and the plant state determining unit 12c displays the Mahalanobis distance D that has been determined to be abnormal on the display 14D of the control panel 14. The displayed Mahalanobis distance D is calculated in Step S204. Then, the process proceeds to Step S210, and the plant state determining unit 12c estimates the items of abnormal state quantities from the difference between the larger-the-better SN (Signal/Noise) ratios according to whether there are items by, for example, orthogonal table analysis. Whether there is an abnormality can be determined from the Mahalanobis distance D. However, it is difficult to determine a place where abnormality occurs from the Mahalanobis distance D. It is easy to specify the place where abnormality occurs or clear up the cause of the abnormality by estimating the items of abnormal state quantities. The plant state determining unit 12c displays the estimated abnormal state quantities on the display 14D of the control panel 14. The difference between the larger-the-better SN ratios according to whether there are items by the orthogonal table analysis is increased in the quantity of state of the abnormal item. Therefore, it is possible to specify abnormal factors by checking the items with a large difference between the larger-the-better SN ratios, for example, the top three items.

According to the above-described embodiment, the unit space used to calculate the Mahalanobis distance or determine whether the plant is in a normal state or an abnormal state is created based on the quantity of state of the plant acquired during the period from the time that is a predetermined time before the time when the state of the plant is evaluated to the time that is a predetermined time before that time. In this way, the period for which information used to create the unit space is acquired is moved with the progress of evaluation. Therefore, even when the quantity of state is changed due to an allowed and assumed factor, for example, a variation with time, in addition to a season variation, it is possible to create the unit space in consideration of the influence of the variation with time. As a result, it is possible to reflect factors causing a variation in the quantity of state to the unit space. In this way, it is possible to prevent the accuracy of the determination of the state of a gas turbine power generation plant from being reduced and accurately determine whether the gas turbine power generation plant is in a normal state or an abnormal state.

INDUSTRIAL APPLICABILITY

The plant state monitoring method, the plant state monitoring computer program, and the plant state monitoring apparatus according to the invention are effective in monitoring the state of a plant and determining whether the state of the plant is normal or abnormal. In particular, according to the invention, it is possible to accurately determine whether a plant is in a normal state or an abnormal state.

The invention claimed is:
1. A plant state monitoring method performed by a plant state monitoring apparatus, said plant state monitoring method comprising:
acquiring a quantity of operation state of a gas turbine power generation plant via at least one sensor which is provided at the gas turbine power generation plant and coupled to the plant state monitoring apparatus, the quantity of operation state comprising a rotation speed of a gas turbine in the gas turbine power generation plant;
storing the acquired quantity of operation state of the gas turbine power generation plant in a storage unit of the plant state monitoring apparatus;
determining, by a processing unit of the plant state monitoring apparatus, that the gas turbine power generation plant is in a start operation period when the rotation speed is greater than or equal to a lower limit rotation speed and less than a rated rotation speed, and determining that the gas turbine power generation plant is in a load operation period when the rotation speed is greater than or equal to the rated rotation speed, the lower limit rotation speed indicating that the gas turbine is started up, and the rated rotation speed indicating that the gas turbine has started a rated speed operation;
creating, by the processing unit, a first unit space, which is a set of data serving as a standard for determining whether or not the operation state of the gas turbine power generation plant during the start operation period is normal, based on the quantity of operation state of the gas turbine power generation plant during the start operation period;
creating, by the processing unit, a second unit space, which is a set of data serving as a standard for determining whether or not the operation state of the gas turbine power generation plant during the load operation period is normal, based on the quantity of operation state of the gas turbine power generation plant during the load operation period;
calculating, by the processing unit, a Mahalanobis distance based on the quantity of operation state of the gas turbine power generation plant acquired when the operation state of the gas turbine power generation plant is evaluated;
determining, by the processing unit, whether the operation state of the gas turbine power generation plant is normal or abnormal, based on the Mahalanobis distance and a predetermined threshold value obtained from the first and second unit spaces; and
in response to a determination that the operation state of the gas turbine power generation plant is abnormal, displaying, on a control panel, information relating to abnormality of the operation state of the gas turbine power generation plant,
wherein
said creating the first unit space comprises creating the first unit space based on the quantity of operation state of the gas turbine power generation plant acquired during a first period before a first time when the operation state of the gas turbine power generation plant is evaluated during the start operation period;
the first period precedes the first time by a first length of time;
the first period shifts along with the first time;
said creating the second unit space comprises creating the second unit space based on the quantity of operation state of the gas turbine power generation plant acquired during a second period before a second time when the operation state of the gas turbine power generation plant is evaluated during the load operation period;
the second period precedes the second time by a second length of time;
the second period shifts along with the second time;
said creating the first unit space comprises, in response to the first time being advanced forward in time,
shifting the first period forward in time corresponding to the advanced first time, and
creating the first unit space without considering the quantity of operation state of the gas turbine power generation plant that was acquired and used to create the first unit space before, but no longer falls in the shifted first period; and
said creating the second unit space comprises, in response to the second time being advanced forward in time,
shifting the second period forward in time corresponding to the advanced second time, and
creating the second unit space without considering the quantity of operation state of the gas turbine power generation plant that was acquired and used to create the second unit space before, but no longer falls in the shifted second period.

2. The plant state monitoring method according to claim 1, further comprising collecting data of the second unit space from both when the load of the gas turbine power generation plant varies and when a rated load is applied.

3. The plant state monitoring method according to claim 2, wherein said creating the first unit space and the second unit space is based on the quantity of operation state which is periodically collected at predetermined time intervals.

4. The plant state monitoring method according to claim 1, wherein the first or second period is from 30 to 80 days.

5. The plant state monitoring method according to claim 1, wherein the first length of time is from 3 to 10 days.

6. The plant state monitoring method according to claim 1, wherein the second length of time is from 3 to 10 days.

7. The plant state monitoring method according to claim 1, wherein
the first period has a fixed first duration while the first period shifts along with the first time, and
the second period has a fixed second duration while the second period shifts along with the second time.

8. The plant state monitoring method according to claim 1, further comprising:
controlling, by the plant state monitoring apparatus, the operation of the gas turbine power generation plant.

9. The plant state monitoring method according to claim 1, wherein
the quantity of operation state further comprises at least one of
an output of a power generator in the gas turbine power generation plant,
a temperature of air drawn to a compressor in the gas turbine power generation plant,
a temperature of each unit of the gas turbine in the gas turbine power generation plant,
a variation in the rotation speed of the gas turbine, and
a variation in the output of the power generator.

10. The plant state monitoring method according to claim 1, wherein
the quantity of operation state further comprises a temperature of each unit of the gas turbine in the gas turbine power generation plant.

11. The plant state monitoring method according to claim 1, wherein
the quantity of operation state further comprises an output of a power generator in the gas turbine power generation plant.

12. The plant state monitoring method according to claim 1, wherein
the quantity of operation state further comprises a variation in an output of a power generator in the gas turbine power generation plant.

13. The plant state monitoring method according to claim 1, wherein
the quantity of operation state further comprises a temperature of air drawn to a compressor in the gas turbine power generation plant.

14. The plant state monitoring method according to claim 1, wherein
the quantity of operation state further comprises a variation in the rotation speed of the gas turbine in the gas turbine power generation plant.

15. The plant state monitoring method according to claim 1, wherein said creating the first unit space and the second unit space is based on the quantity of operation state which is periodically collected at predetermined time intervals.

16. A non-transitory computer-readable recording medium containing computer executable instructions to cause a computer of a plant state monitoring apparatus to perform:
acquiring a quantity of operation state of a gas turbine power generation plant via at least one sensor which is provided at the gas turbine power generation plant and coupled to the plant state monitoring apparatus, the quantity of operation state comprising a rotation speed of a gas turbine in the gas turbine power generation plant;
storing the acquired quantity of operation state of the gas turbine power generation plant in a storage unit of the plant state monitoring apparatus;
determining, by a processing unit of the plant state monitoring apparatus, that the gas turbine power generation plant is in a start operation period when the rotation speed is greater than or equal to a lower limit rotation speed and less than a rated rotation speed, and determining that the gas turbine power generation plant is in a load operation period when the rotation speed is greater than or equal to the rated rotation speed, the lower limit rotation speed indicating that the gas turbine is started up, and the rated rotation speed indicating that the gas turbine has started a rated speed operation;
creating, by the processing unit, a first unit space, which is a set of data serving as a standard for determining whether or not the operation state of the gas turbine power generation plant during the start operation period is normal, based on the quantity of operation state of the gas turbine power generation plant during the start operation period;
creating, by the processing unit, a second unit space, which is a set of data serving as a standard for determining whether or not the operation state of the gas turbine power generation plant during the load operation period is normal, based on the quantity of operation state of the gas turbine power generation plant during the load operation period;
calculating, by the processing unit, a Mahalanobis distance based on the quantity of operation state of the gas turbine power generation plant, acquired when the operation state of the gas turbine power generation plant is evaluated; and
determining, by the processing unit, whether the operation state of the gas turbine power generation plant is normal or abnormal, based on the Mahalanobis distance and a predetermined threshold value obtained from the first and second unit spaces; and
in response to a determination that the operation state of the gas turbine power generation plant is abnormal, displaying, on a control panel, information relating to abnormality of the operation state of the gas turbine power generation plant,
wherein
said creating the first unit space comprises creating the first unit space based on the quantity of operation state of the gas turbine power generation plant acquired during a first period before a first time when the operation state of the gas turbine power generation plant is evaluated during the start operation period;
the first period precedes the first time by a first length of time;
the first period shifts along with the first time;
said creating the second unit space comprises creating the second unit space based on the quantity of operation state of the gas turbine power generation plant acquired during a second period before a second time when the operation state of the gas turbine power generation plant is evaluated during the load operation period;
the second period precedes the second time by a second length of time;
the second period shifts along with the second time;
said creating the first unit space comprises, in response to the first time being advanced forward in time,
shifting the first period forward in time corresponding to the advanced first time, and
creating the first unit space without considering the quantity of operation state of the gas turbine power generation plant that was acquired and used to create the first unit space before, but no longer falls in the shifted first period; and
said creating the second unit space comprises, in response to the second time being advanced forward in time,
shifting the second period forward in time corresponding to the advanced second time, and
creating the second unit space without considering the quantity of operation state of the gas turbine power generation plant that was acquired and used to create the second unit space before, but no longer falls in the shifted second period.

17. A plant state monitoring apparatus, comprising:
an input and output unit configured to be coupled to at least one sensor, which is provided at a gas turbine power generation plant, and to acquire a quantity of operation state of the gas turbine power generation plant from the at least one sensor, the quantity of operation state comprising a rotation speed of a gas turbine in the gas turbine power generation plant;
a storage unit configured to store the acquired quantity of operation state of the gas turbine power generation plant;
a unit space creating unit which is configured to
determine that the gas turbine power generation plant is in a start operation period when the rotation speed is greater than or equal to a lower limit rotation speed and less than a rated rotation speed, and determine that the gas turbine power generation plant is in a load operation period when the rotation speed is greater than or equal to the rated rotation speed, the lower limit rotation speed indicating that the gas turbine is started up, and the rated rotation speed indicating that the gas turbine has started a rated speed operation,
create a first unit space, which is a set of data serving as a standard for determining whether or not the operation state of the gas turbine power generation plant during the start operation period is normal, based on the quantity of operation state of the gas turbine power generation plant during the start operation period, and
create a second unit space, which is a set of data serving as a standard for determining whether or not the operation state of the gas turbine power generation plant during the load operation period is normal, based on the quantity of operation state of the gas turbine power generation plant during the load operation period;
a Mahalanobis distance calculating unit which is configured to calculate a Mahalanobis distance based on the quantity of operation state of the gas turbine power generation plant, acquired when the operation state of the gas turbine power generation plant is evaluated; and a plant state determining unit which is configured to determine whether the operation state of the gas turbine power generation plant is normal or abnormal, based on the Mahalanobis distance calculated by the Mahalanobis distance calculating unit and a predetermined threshold value obtained from the first and second unit spaces created by the unit space creating unit,
wherein the input and output unit is configured to, in response to a determination that the operation state of the gas turbine power generation plant is abnormal, output, to a control panel, information relating to abnormality of the operation state of the gas turbine power generation plant,
wherein said unit space creating unit is configured to
create the first unit space based on the quantity of operation state of the gas turbine power generation plant acquired during a first period before a first time when the operation state of the gas turbine power generation plant is evaluated during the start operation period, the first period preceding the first time by a first length of time, and the first period shifting along with the first time; and
create the second unit space based on the quantity of operation state of the gas turbine power generation plant acquired during a second period before a second time when the operation state of the gas turbine power generation plant is evaluated during the load operation period, the second period preceding the second time by a second length of time, and the second period shifting along with the second time;
wherein said unit space creating unit is further configured to create the first unit space, in response to the first time being advanced forward in time, by
shifting the first period forward in time corresponding to the advanced first time, and
creating the first unit space without considering the quantity of operation state of the gas turbine power generation plant that was acquired and used to create the first unit space before, but no longer falls in the shifted first period; and
wherein said unit space creating unit is further configured to create the second unit space, in response to the second time being advanced forward in time, by
shifting the second period forward in time corresponding to the advanced second time, and
creating the second unit space without considering the quantity of operation state of the gas turbine power generation plant that was acquired and used to create the second unit space before, but no longer falls in the shifted second period.

18. The plant state monitoring apparatus according to claim 17, wherein the plant state monitoring apparatus is configured to control the operation of the gas turbine power generation plant.

19. A plant state monitoring method performed by a plant state monitoring apparatus, said plant state monitoring method comprising:
acquiring a quantity of operation state of a gas turbine power generation plant via at least one sensor which is provided at the gas turbine power generation plant and coupled to the plant state monitoring apparatus, the quantity of operation state comprising a rotation speed of a gas turbine in the gas turbine power generation plant;

storing the acquired quantity of operation state of the gas turbine power generation plant in a storage unit of the plant state monitoring apparatus;

determining, by a processing unit of the plant state monitoring apparatus, that the gas turbine power generation plant is in a start operation period when the rotation speed is greater than or equal to a lower limit rotation speed and less than a rated rotation speed, and determining that the gas turbine power generation plant is in a load operation period when the rotation speed is greater than or equal to the rated rotation speed, the lower limit rotation speed indicating that the gas turbine is started up and the rated rotation speed indicating that the gas turbine has started a rated speed operation;

creating, by the processing unit, a first unit space, which is a set of data serving as a standard for determining whether or not the operation state of the gas turbine power generation plant during the start operation period or the load operation period is normal, based on the quantity of operation state of the gas turbine power generation plant acquired during a first period before a first time when the operation state of the gas turbine power generation plant is evaluated, the first period preceding the first time by a first length of time, and the first period shifting along with the first time;

creating, by the processing unit, a second unit space, which is a set of data serving as a standard for determining whether or not the operation state of the gas turbine power generation plant is normal, based on the quantity of operation state of the gas turbine power generation plant acquired during a second period before a second time when the operation state of the gas turbine power generation plant is evaluated, the second period preceding the second time by a second length of time, and the second period shifting along with the second time;

determining, by the processing unit, whether the operation state of the gas turbine power generation plant is normal or abnormal, based on the first and second unit spaces; and in response to a determination that the operation state of the gas turbine power generation plant is abnormal, displaying, on a control panel, information relating to abnormality of the operation state of the gas turbine power generation plant, wherein said creating the first unit space comprises, in response to the first time being advanced forward in time,
  shifting the first period forward in time corresponding to the advanced first time, and
  creating the first unit space without considering the quantity of operation state of the gas turbine power generation plant that was acquired and used to create the first unit space before, but no longer falls in the shifted first period; and said creating the second unit space comprises, in response to the second time being advanced forward in time,
  shifting the second period forward in time corresponding to the advanced second time, and
  creating the second unit space without considering the quantity of operation state of the gas turbine power generation plant that was acquired and used to create the second unit space before, but no longer falls in the shifted second period.

20. The plant state monitoring method according to claim 19, further comprising:

controlling, by the plant state monitoring apparatus, the operation of the gas turbine power generation plant.

21. The plant state monitoring method according to claim 19,
wherein the quantity of operation state of the gas turbine power generation plant, at any time or a plurality of times in one full day within the first period, is used as the quantity of operation state for creating the first unit space.

22. The plant state monitoring method according to claim 21,
wherein the quantity of operation state is excluded in chronological order from being used in the creation of the first and second unit spaces, such that the oldest quantity of operation state is excluded first.

23. The plant state monitoring method according to claim 19,
wherein the quantity of operation state is excluded in chronological order from being used in the creation of the first and second unit spaces, such that the oldest quantity of operation state is excluded first.

24. A non-transitory computer-readable recording medium containing computer executable instructions to cause a computer of a plant state monitoring apparatus to perform:

acquiring a quantity of operation state of a gas turbine power generation plant via at least one sensor which is provided at the gas turbine power generation plant and coupled to the plant state monitoring apparatus, the quantity of operation state comprising a rotation speed of a gas turbine in the gas turbine power generation plant;

storing the acquired quantity of operation state of the gas turbine power generation plant in a storage unit of the plant state monitoring apparatus;

determining, by a processing unit of the plant state monitoring apparatus, that the gas turbine power generation plant is in a start operation period when the rotation speed is greater than or equal to a lower limit rotation speed and less than a rated rotation speed, and determining that the gas turbine power generation plant is in a load operation period when the rotation speed is greater than or equal to the rated rotation speed, the lower limit rotation speed indicating that the gas turbine is started up and the rated rotation speed indicating that the gas turbine has started a rated speed operation;

creating, by the processing unit, a first unit space, which is a set of data serving as a standard for determining whether or not the operation state of the gas turbine power generation plant during the start operation period or the load operation period is normal, based on the quantity of operation state of the gas turbine power generation plant acquired during a first period before a first time when the operation state of the gas turbine power generation plant is evaluated, the first period preceding the first time by a first length of time, and the first period shifting along with the first time;

creating, by the processing unit, a second unit space, which is a set of data serving as a standard for determining whether or not the operation state of the gas turbine power generation plant is normal, based on the quantity of operation state of the gas turbine power generation plant acquired during a second period before a second time when the operation state of the gas turbine power generation plant is evaluated, the second period preceding the second time by a second length of time, and the second period shifting along with the second time;

determining, by the processing unit, whether the operation state of the gas turbine power generation plant is normal or abnormal, based on the first and second unit spaces; and in response to a determination that the operation state of the gas turbine power generation plant is abnormal, displaying, on a control panel, information relating to abnormality of the operation state of the gas turbine power generation plant, wherein said creating the first unit space comprises, in response to the first time being advanced forward in time,
shifting the first period forward in time corresponding to the advanced first time, and
creating the first unit space without considering the quantity of operation state of the gas turbine power generation plant that was acquired and used to create the first unit space before, but no longer falls in the shifted first period; and said creating the second unit space comprises, in response to the second time being advanced forward in time,
shifting the second period forward in time corresponding to the advanced second time, and
creating the second unit space without considering the quantity of operation state of the gas turbine power generation plant that was acquired and used to create the second unit space before, but no longer falls in the shifted second period.

25. The non-transitory computer-readable recording medium according to claim 24, wherein the computer executable instructions are further configured to cause the computer of the plant state monitoring to control the operation of the gas turbine power generation plant.

26. A plant state monitoring apparatus, comprising:
an input and output unit configured to be coupled to at least one sensor, which is provided at a gas turbine power generation plant, and to acquire a quantity of operation state of the gas turbine power generation plant from the at least one sensor, the quantity of operation state comprising a rotation speed of a gas turbine in the gas turbine power generation plant;
a storage unit configured to store the acquired quantity of operation state of the gas turbine power generation plant;
a unit space creating unit which is configured to
determine that the gas turbine power generation plant is in a start operation period when the rotation speed is greater than or equal to a lower limit rotation speed and less than a rated rotation speed, and determine that the gas turbine power generation plant is in a load operation period when the rotation speed is greater than or equal to the rated rotation speed, the lower limit rotation speed indicating that the gas turbine is started up and the rated rotation speed indicating that the gas turbine has started a rated speed operation,
create a first unit space, which is a set of data serving as a standard for determining whether or not the operation state of the gas turbine power generation plant during the start operation period or the load operation period is normal, based on the quantity of operation state of the gas turbine power generation plant during a first period before a first time when the operation state of the gas turbine power generation plant is evaluated, the first period preceding the first time by a first length of time, and the first period shifting along with the first time, and
create a second unit space, which is a set of data serving as a standard for determining whether or not the operation state of the gas turbine power generation plant is normal, based on the quantity of operation state of the gas turbine power generation plant acquired during a second period before a second time when the operation state of the gas turbine power generation plant is evaluated, the second period preceding the second time by a second length of time, and the second period shifting along with the second time;

a Mahalanobis distance calculating unit which is configured to calculate a Mahalanobis distance based on the quantity of operation state of the gas turbine power generation plant, acquired when the operation state of the gas turbine power generation plant is evaluated; and a plant state determining unit which is configured to determine whether the operation state of the gas turbine power generation plant is normal or abnormal, based on the Mahalanobis distance calculated by the Mahalanobis distance calculating unit and a predetermined threshold value obtained from the first or second unit space created by the unit space creating unit, wherein the input and output unit is configured to, in response to a determination that the operation state of the gas turbine power generation plant is abnormal, output, to a control panel, information relating to abnormality of the operation state of the gas turbine power generation plant, wherein said unit space creating unit is further configured to create the first unit space, in response to the first time being advanced forward in time, by
shifting the first period forward in time corresponding to the advanced first time, and
creating the first unit space without considering the quantity of operation state of the gas turbine power generation plant that was acquired and used to create the first unit space before, but no longer falls in the shifted first period; and wherein said unit space creating unit is further configured to create the second unit space, in response to the second time being advanced forward in time, by
shifting the second period forward in time corresponding to the advanced second time, and
creating the second unit space without considering the quantity of operation state of the gas turbine power generation plant that was acquired and used to create the second unit space before, but no longer falls in the shifted second period.

27. The plant state monitoring apparatus according to claim 26, wherein the plant state monitoring apparatus is configured to control the operation of the gas turbine power generation plant.

28. The plant state monitoring apparatus according to claim 26,
wherein the unit space creating unit is configured to use the quantity of operation state of the gas turbine power generation plant, at any time or a plurality of times in one full day within the first period, as the quantity of operation state for creating the first unit space.

29. The plant state monitoring apparatus according to claim 28,
wherein the unit space creating unit is configured to exclude the quantity of operation state in chronological order from being used in the creation of the first and second unit spaces, such that the oldest quantity of operation state is excluded first.

30. The plant state monitoring apparatus according to claim 26,
   wherein the unit space creating unit is configured to exclude the quantity of operation state in chronological order from being used in the creation of the first and second unit spaces, such that the oldest quantity of operation state is excluded first.

31. The non-transitory computer-readable recording medium according to claim 16, wherein the computer executable instructions are further configured to cause the computer of the plant state monitoring to control the operation of the gas turbine power generation plant.

* * * * *